United States Patent [19]

Clarke et al.

[11] 4,417,782

[45] Nov. 29, 1983

[54] FIBER OPTIC TEMPERATURE SENSING

[75] Inventors: Raymond Clarke, Sunnyvale; Chester L. Sandberg, Palo Alto, both of Calif.

[73] Assignee: Raychem Corporation, Menlo Park, Calif.

[21] Appl. No.: 136,057

[22] Filed: Mar. 31, 1980

[51] Int. Cl.$^3$ .............................................. G02B 5/172
[52] U.S. Cl. .................. 350/96.29; 250/577; 320/35; 350/96.33; 350/96.34; 350/320; 356/44; 356/256
[58] Field of Search ............... 350/96.10, 96.29, 96.30, 350/96.31, 96.32, 96.33, 96.34, 320; 356/43, 44, 432, 436, 437, 256; 250/573, 577, 227; 320/35

[56] References Cited

U.S. PATENT DOCUMENTS

| | | | |
|---|---|---|---|
| 3,208,342 | 9/1965 | Nethercot . | |
| 3,609,731 | 9/1971 | Evans | 340/227 C |
| 3,625,589 | 8/1959 | Snitzer | 350/96.29 |
| 3,819,250 | 6/1974 | Kibler | 350/96.29 |
| 3,841,731 | 10/1974 | Midwinter . | |
| 4,151,747 | 5/1979 | Gottlieb et al. | 73/339 R |
| 4,201,446 | 5/1980 | Geddes et al. . | |
| 4,203,326 | 5/1980 | Gottlieb et al. . | |
| 4,278,349 | 7/1981 | Sander | 356/44 |

FOREIGN PATENT DOCUMENTS

| | | | |
|---|---|---|---|
| 1134027 | 11/1968 | United Kingdom | 356/43 |
| 1438961 | 6/1976 | United Kingdom . | |
| 1582768 | 1/1981 | United Kingdom . | |
| 495559 | 2/1976 | U.S.S.R. . | |

OTHER PUBLICATIONS

Yeh et al., "How Does One Induce Leakage . . . ", *Agard Conf. Proc.* N219, London, May 1977, pp. 26.1–26.5.
"Review of NASA Fiber Optics Tasks", *Agard Conf. Proc.* N219, London, May 1977, pp. 6.1–6.14.
Gottlieb et al., "Measurement of Temperature with Optical Fibers . . . ", *Electro-Optics Conf.*, Anaheim, Calif., Oct. 1978.
Gottlieb et al., "Non-Interferometric Measurement of Temperature . . . ", Oct. 17, 1978.
Yeung et al., "Effect of Temperature on Optical Fiber Transmission", *Applied Optics*, vol. 17, No. 23, Dec. 1978, pp. 3703–3705.

*Primary Examiner*—John D. Lee
*Attorney, Agent, or Firm*—Lyon & Lyon

[57] ABSTRACT

Fiber optic waveguides exhibiting a blackout phenomenon can be used for temperature sensing. A temperature sensing waveguide can be used in such applications as maintaining a material within a selected temperature range, freeze protection viscosity control of liquids in pipelines, leak detection of cryogenic fluids, fire detection, application of heat-recoverable materials, battery charging, and fluid level detection. Novel waveguides exhibiting blackout at selected temperatures for use in these applications are described.

120 Claims, 12 Drawing Figures

ATTENUATION VS. TEMPERATURE

*INCREASE IN ATTENUATION VS ROOM TEMPERATURE ATTENUATION

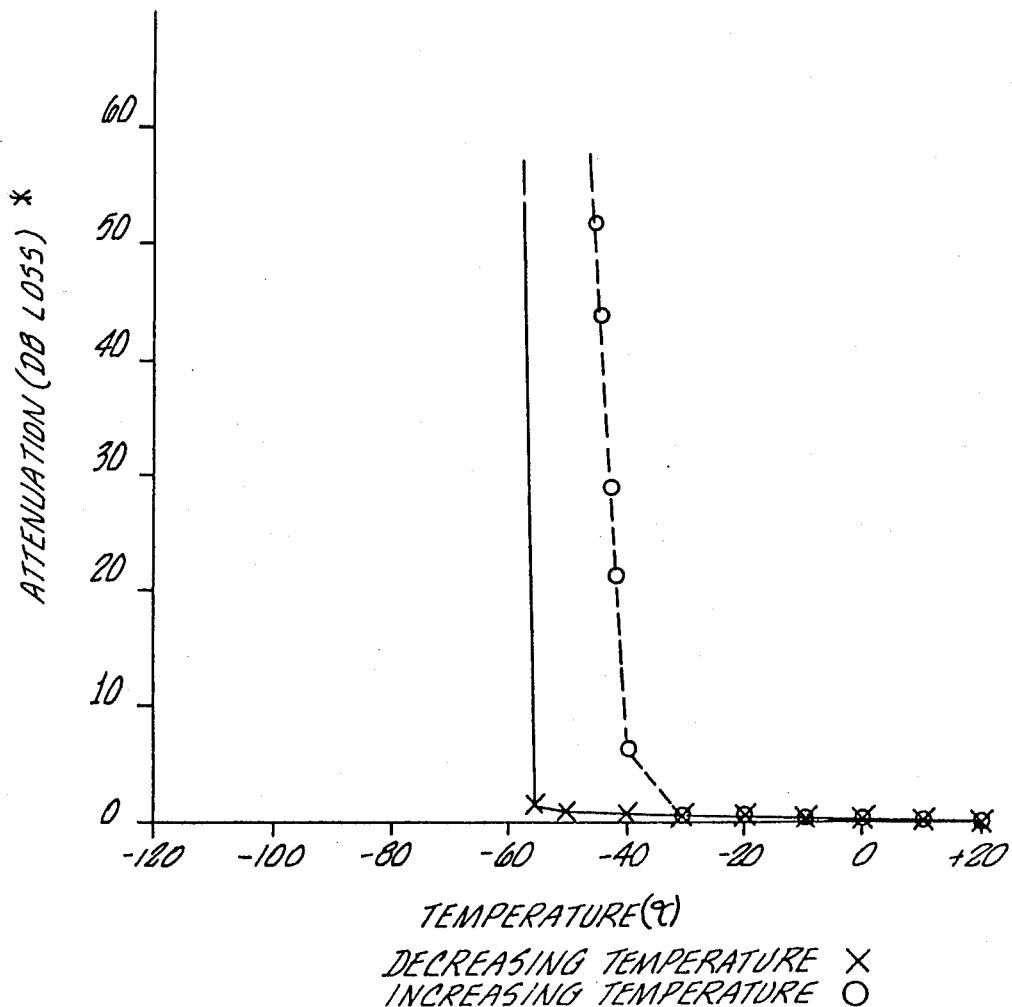

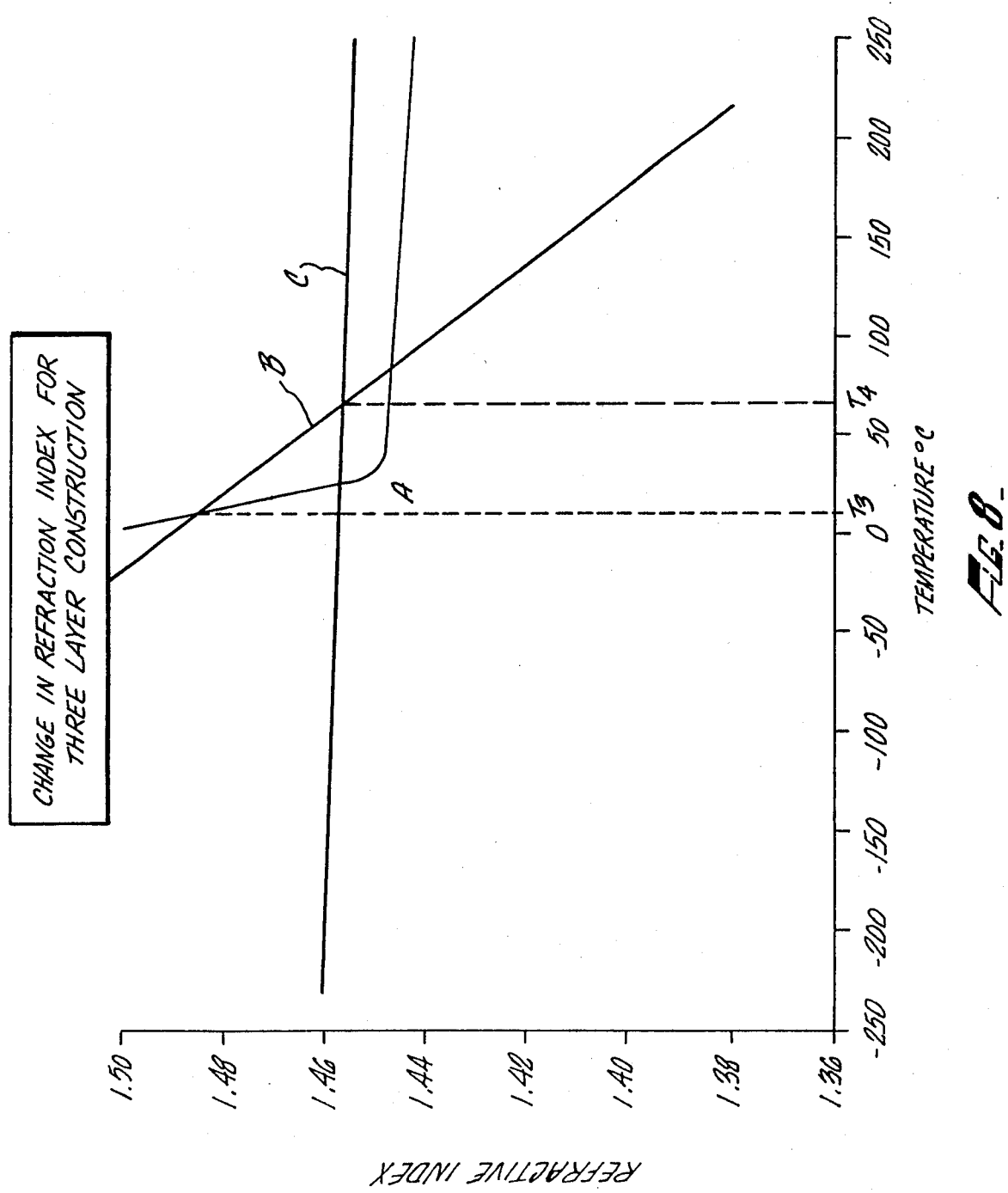

* INCREASE IN ATTENUATION VS. 100°C ATTENUATION

FIG_10

*INCREASE IN ATTENUATION VS 200°C ATTENUATION

FIBER OPTIC TEMPERATURE SENSING

CROSS-REFERENCE

This application is related to copending and co-assigned application Ser. No. 136,076, filed Mar. 31, 1980 by Raymond Clarke, entitled "THERMOSTATIC FIBER OPTIC WAVEGUIDES", which is incorporated herein by this reference.

BACKGROUND OF THE INVENTION

The present invention is directed to methods for using fiber optic waveguides for temperature monitoring.

The use of fiber optics for transmitting information has recently received a great deal of attention because of the light weight, security, safety, and electrical isolation that can be obtained with a fiber optic system. It has also been proposed to use optical fibers for noninterferometric measurement of temperatures in a paper by Gottlieb et al presented at the Electro-Optics conference in Anaheim, Calif. in October, 1978. Gottlieb et al proposed that the loss of light to the cladding of a waveguide depends upon the temperature of the waveguide. In U.S. Pat. No. 4,151,747 issued to Gottlieb et al, there are described fiber optic temperature monitoring systems.

There are many applications in which it would be advantageous to use a fiber optic system for temperature measurement and monitoring, for which no system has been available. For example, when monitoring the temperature of flammable fluids, it would be preferred to use a non-electrical system to avoid the explosion hazard associated with electrical temperature monitoring systems. In some applications, such as monitoring the temperatures of electrical generators, the high RF noise produced interferes with conventional remote sensing methods. The use of fiber optic systems for monitoring temperatures in these applications andother applications has been hampered by the non-availability of suitable waveguides which have light transmission properties that vary substantially at useful temperatures.

In view of the foregoing, there is a need for systems for monitoring temperatures using fiber optic waveguides.

SUMMARY

The present invention is directed to methods and systems using fiber optic waveguides for temperature sensing. The waveguides used comprise a core and a cladding disposed on and around the exterior surface of the core, where at least a portion of the waveguide exhibits blackout at a selected blackout temperature. By "blackout", there is meant that on one side of the blackout temperature or temperature range, the waveguide transmits light, but on the opposie side of the blackout temperature or temperature range, substantially no light is transmitted through the waveguide. This blackout phenomenon occurs when the index of refraction of the core and the index of refraction of the cladding become about equal. The blackout can also be the result of crystallization of the cladding, crystallization causing a change in the refractive index of the cladding and/or light scattering.

Novel waveguides described herein which are the subject of the aforementioned application Ser. No. 136,076 by Clarke, provide the opportunity to use fiber optic systems in applications never heretofore thought possible. It is now possible to tailor make waveguides so that they blackout at selected temperatures. Among the applications for these waveguides are methods and systems for maintaining a material within a selected temperature range. In such an application, at least part of a waveguide is placed in thermal communication with the material so that the temperature of said part of the waveguide is responsive to the temprature of the material. The waveguide is chosen so that said part of the waveguide exhibits blackout at a selected blackout temperature at about the bottom or at about the top of the selected temperatue range. Light is directed at one end of the waveguide and the intensity of light transmitted by said part of the waveguide is monitored. The onset of a substantial change in the intensity of light transmitted by said part indicates that the material is at a temperature near the top or bottom of the selected temperature range. When the substantial change in the intensity of the light transmitted by said part of the waveguide occurs, the temperature of the material is adjusted so that it is maintained within the selected temperature range.

Other systems and methods which can use these novel waveguides include systems and methods for preventing a material from undergoing a change in phase, such as preventing liquids from freezing; systems and methods for preventing the viscosity of a liquid in a pipeline from increasing above a selected value; systems and methods for detecting fire; systems and methods for regulating the charging of batteries; and systems and methods for applying an article containing a heat-activatable material to a substrate, such as a heat-recoverable tubular sleeve containing a heat-activatable adhesive to a pipe. In this last application, the waveguide is placed in thermal communication with the article so that the temperature of the waveguide is responsive to the temperature of the heat-activatable material. The waveguide is selected so that its blackout temperature is no less than the temperature at which the heat activatable material is activated. Light is directed at one end of the waveguide and the intensity of light transmitted by the waveguide is monitored. The heat-recoverable material is heated at least until the intensity of light transmitted by the waveguide has undergone a substantial change.

DRAWINGS

These and other features, aspects, and advantages of the present invention will become better understood with reference to the appended claims, the following description, and accompanying drawings, where:

FIG. 1 is a graph of calculated change in refractive index vs. temperature for two materials useful for preparing waveguides;

FIG. 2 presents graphs of attenuation vs. temperature for different types of waveguides, demonstrating the blackout that can occur as the temperature of the waveguide is reduced;

FIG. 4 is a graph of attenuation vs. temperature for a waveguide showing low temperature transmission characteristics;

FIG. 8 is a graph of refractive index vs. temperature of the components of the three layer waveguide upon which FIG. 7 is based;

Figure 12:
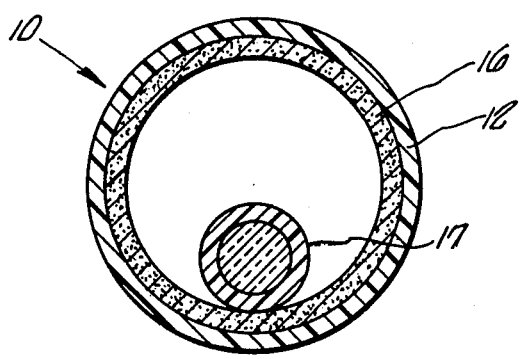
Figure 11:
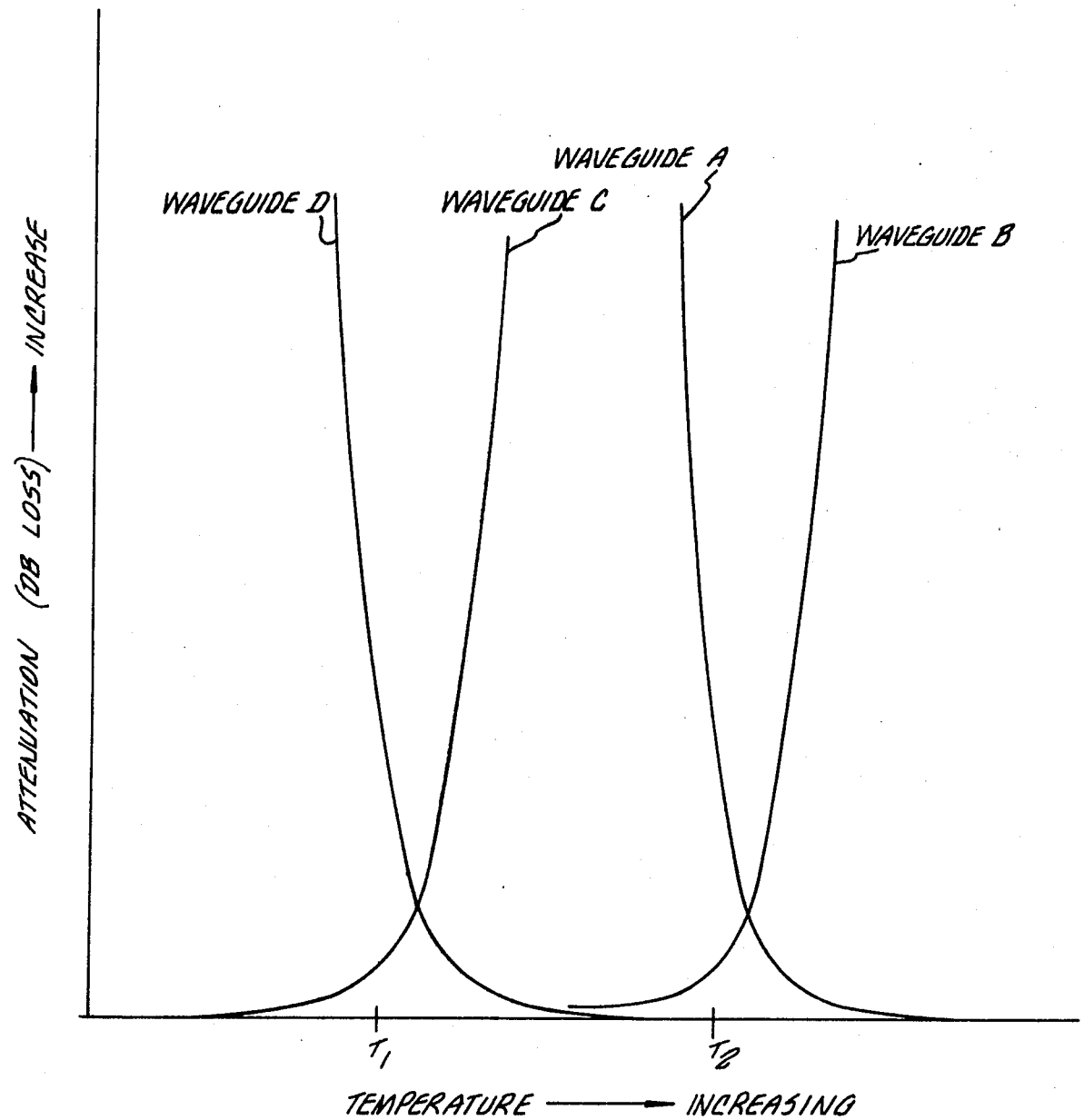

FIG. 11 is a graph of attenuation vs. temperature for four waveguides which can be used for maintaining a material within a selected temperature range of $T_1$ to $T_2$; and FIG. 12 is a cross-sectional view of a heat-shrinkable material having a heat-activatable adhesive layer and a waveguide, the waveguide detecting the temperature to which the heat-shrinkable sleeve and the adhesive layer are heated.

DESCRIPTION

A. Introduction and Definitions

The present invention is directed to the use of fiber optic waveguides as temperature sensors. Use is made of the principle that waveguides can be prepared so that at a selected temperature or within a selected temperature range, the waveguide can exhibit blackout, i.e., the waveguide transmits substantially no light. Blackout is detected with a monitor in that it is determined that the light transmission property of the waveguide has undergone a substantial change. As used herein, the term "substantial change" in light transmission property refers to a decrease or increase of at least 3 db (decibels), and preferably at least about 5 db, amounts that can be detected with state-of-the-art monitors. For example, a substantial change can be a change in attenuation from 5 db up to 8 db, from 20 db up to 25 db, 10 db down to 7 db, or 25 db down to 20 db The "blackout temperature" is the temperature or temperature range where blackout occurs. It is characterized by a substantial change in attenuation over a very small temperature change, and generally over a temperature change of 3° C. or less. In other words, preferably a plot of attenuation vs. temperature has a positive slope of at least about 1 db/(1° C.) or a negative slope of about −1 db/(1° C.) or less, at the blackout temperature.

As used herein, the term "sensing element" refers to a waveguide or a portion of a waveguide that exhibits blackout at one or more selected temperatures or temperature ranges.

To determine if a substantial change in the light transmission property of a waveguide has occurred, it is necessary to monitor the intensity of light transmitted by the waveguide. As used herein, the term "monitoring" the intensity of the light refers to monitoring light at either end of the waveguide using conventional monitoring equipment. For example, using an optical time domain reflectometer such as Model ODTR-103 sold by Orionics, Inc. of Albuquerque, N. Mex., it is possible to monitor for transmitted light at the same end of a waveguide at which light pulses are launched into the waveguide.

In one version of the present invention, a waveguide can undergo a permanent change in its light transmission properties after its temperature is increased or lowered to a selected temperature. By the term "permanent" change, there is meant that the change in light transmission properties is irreversible. For example, a waveguide can be prepared that until it is heated to a temperature greater than about 100° C., it is substantially incapable of transmitting light, but once it is heated to 100° C., it will transmit light, even if subsequently, the temperature of the waveguide is lowered to below 100° C.

B. Waveguides

Waveguides consisting of a variety of materials have been developed in the prior art. For example, waveguides consisting of a glass fiber core and glass cladding, glass cladding and a liquid core, a polymeric fiber core and polymeric cladding, and a glass fiber core and polymeric cladding are known. U.S. patent application Ser. No. 964,506 filed by Ellis et al on Nov. 29, 1978, (now U.S. Pat. No. 4,290,668) is incorporated herein by reference, is directed to waveguides comprised of a quartz glass core and polymeric cladding of polydimethyl siloxane. U.S. Pat. No. 3,819,250 issued to Kibler describes a waveguide comprising a quartz cladding and a liquid core which can be carbon tetrachloride.

Figure 1:
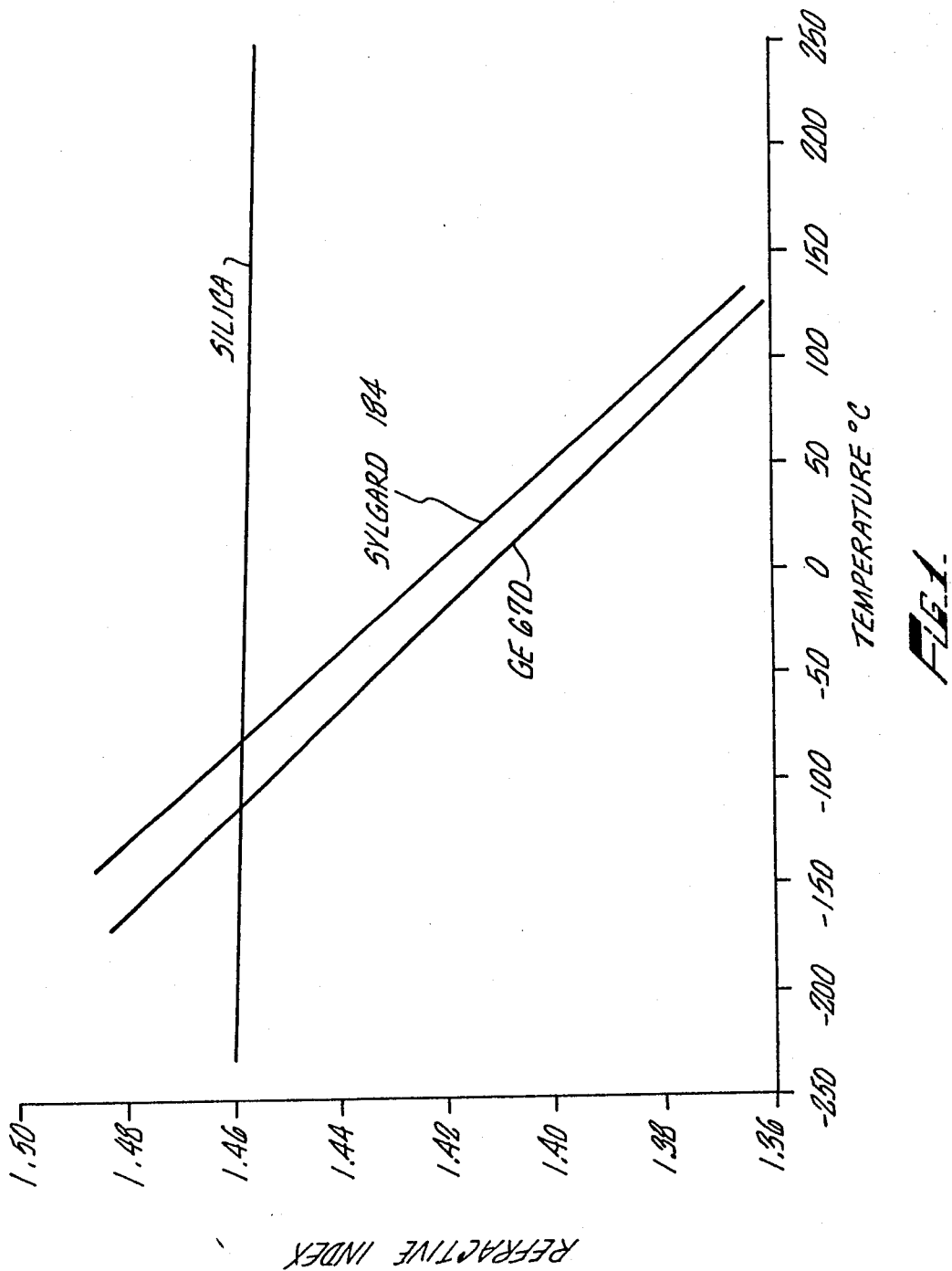

The effectiveness of the present invention relies upon the use of a waveguide where the refractive index of the core and the refractive index of the cladding change with temperature at different rates. For example, silica has a much lower coefficient of thermal expansion than polymers in general, and especially siloxanes. Because of this, the refractive index of a siloxane cladding changes much more rapidly with temperature than a silica core. Using the expression $(1/P)(dP/dT) = -q(n)\alpha$ (Polymer Handbook, Immergut & Bandrup) it is possible to calculate the refractive indices of a core and a cladding vs. temperature. For example, FIG. 1 presents the calculated change in refractive index vs. temperature for silica and two commercially-available siloxanes, Sylgard 184 and GE 670. Sylgard 184 is branched polydimethyl siloxane with some phenyl substitution available from Dow Corning. GE 670 is a branched polydimethyl siloxane available from General Electric.

The waveguides used in the present invention include novel waveguides which use the invention of Raymond Clarke and which are the subject matter of the aforementioned application Ser. No. 136,076.

Figure 2:
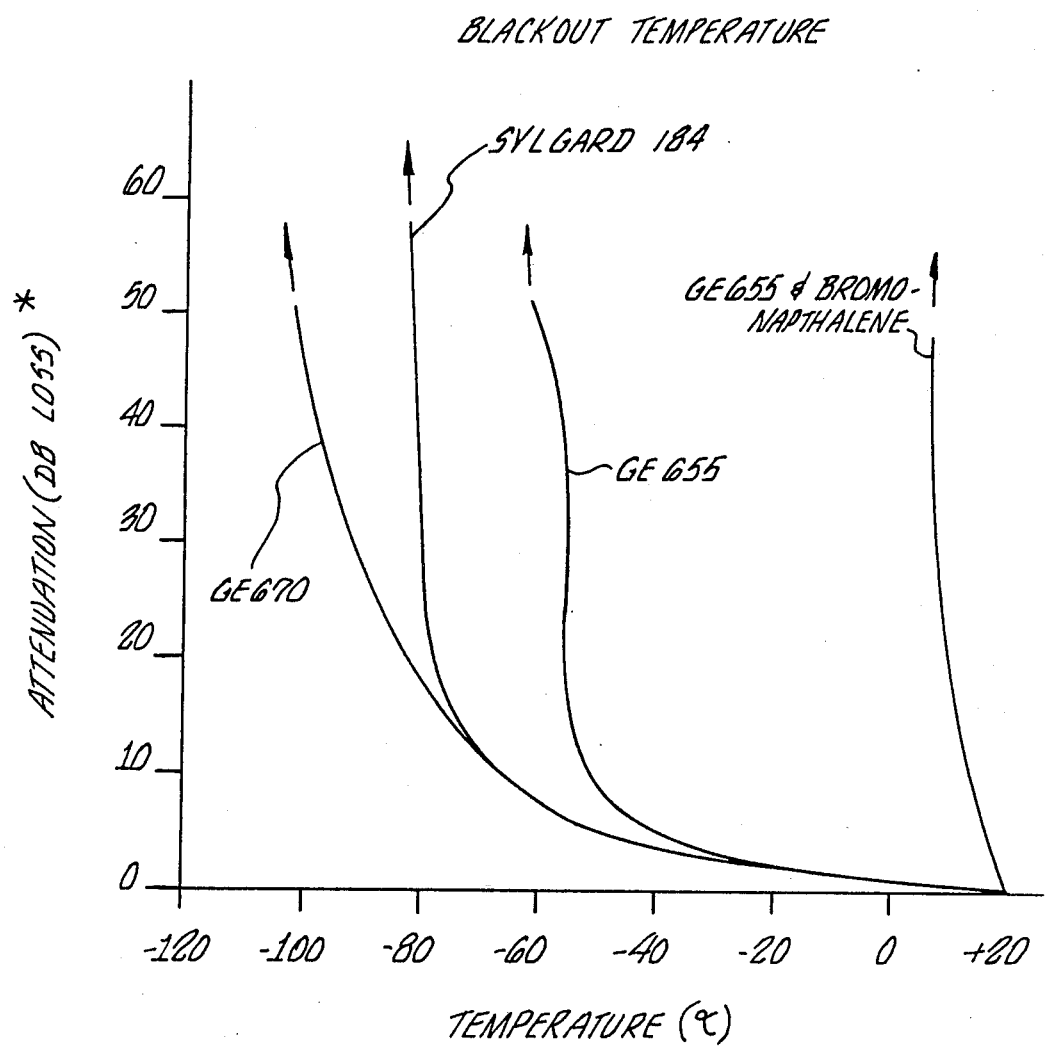

In order for a waveguide to transmit light, it is necessary that the refractive index of the cladding be less than the refractive index of the core. When the refractive index of the core and the cladding are about equal, light is no longer contained by the cladding and a blackout occurs. FIG. 2 shows the blackout phenomenon for a number of commercially available siloxanes coated on a silica fiber. FIG. 2 presents attenuation in db vs. temperatue for GE 670, Sylgard 184, and GE 655 claddings on a silica core. The waveguides were about 100 meters long. The silica core was about 200 microns in diameter and the cladding was about 20 microns thick. GE 655 is branched polydimethyl siloxane with some phenyl substitution. The data presented in FIG. 2 were obtained by measuring the attenuation of the waveguide resulting from the waveguide being cooled at 2° C./minute. The blackout tempratures shown for the GE 670 and Sylgard 184 clad fibers correlate approximately with the crossover points in refractive index shown in FIG. 1.

In practice, as the temperatue of one of the waveguides of FIG. 2 is decreased, a substantial change in attenuation is noted until eventually no light is transmitted. This phenomenon occurs even if only a very short portion of a long waveguide is cooled to the blackout temperature. For example, cooling a one centimeter length of a one kilometer long waveguide to the blackout temperature can be detected as a substantial increase in attenuation of transmitted light.

The reverse of this phenomenon also occurs. As the GE 670/silica, Sylgard 184/silica, and GE 655/silica waveguides are heated from a temperature of −100° C. to a temperature greater than −40° C., the amount of light transmitted by the waveguide increases. Initially, substantially no light is transmitted, until eventually light is transmitted by the waveguides.

Figure 3:
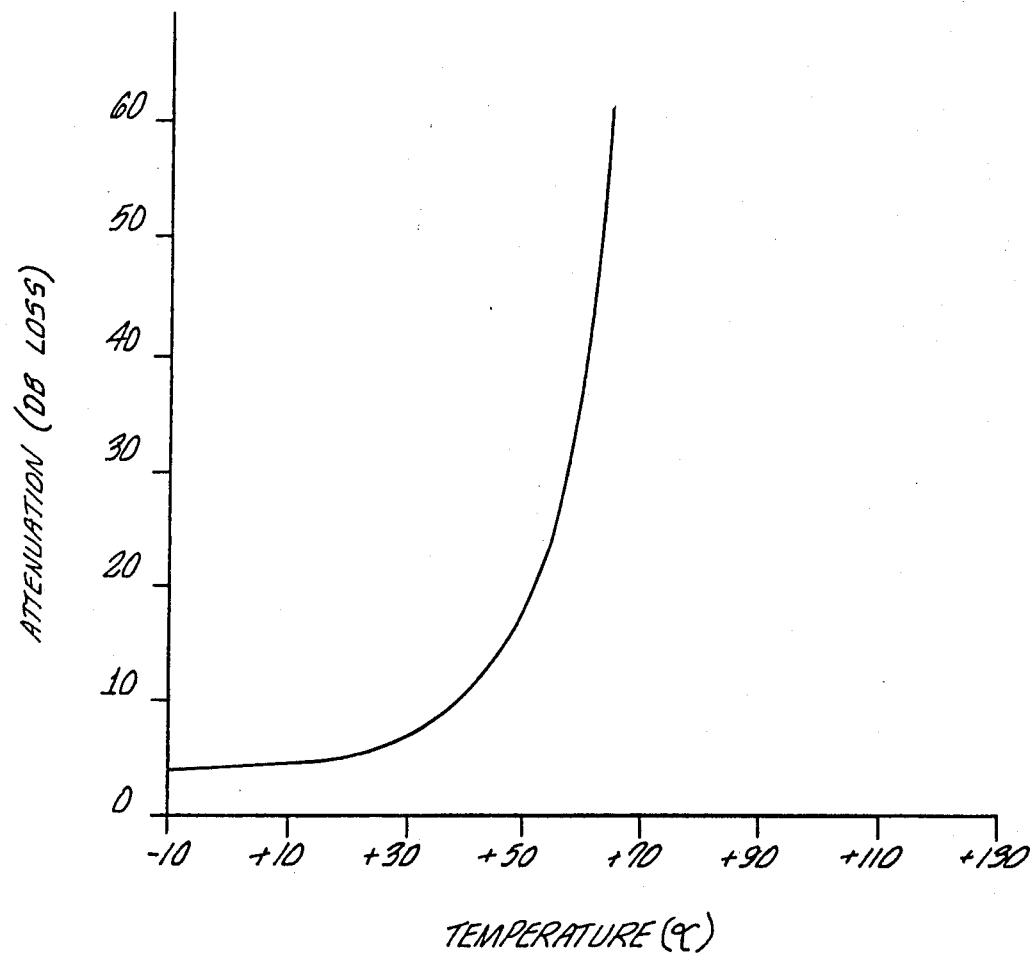
FIG. 3 is a graph of attenuation vs. temperature for a waveguide and demonstrates that blackout can occur when the temperature of a waveguide is increased.

In some applications, it is desirable that the waveguide exhibit blackout as its temperature is raised. The attenuation of such a waveguide is shown in FIG. 3, where the waveguide exhibits blackout at about 50° C. At temperatures less than about 50° C., the waveguide transmits light. A waveguide with a cladding of silica, the exterior surface of which is coated with a material that will inhibit Light Propagation in the cladding i.e. a light absorptive material such as polymethylphenyl siloxane having an index of refraction of about 1.50 containing about 5% by weight of carbon black, and a core of polymethylphenyl siloxane with a refractive index of 1.47 at 23° C. exhibits an attenuation vs. temperature curve similar to that shown in FIG. 3. A disadvantage with such a waveguide is that even at temperatures at which it transmits light, the amount of attenuation is substantially more than is obtained with a waveguide with a silica core because silica has much better optical properties than polymethylphenyl siloxane. However, this disadvantage is not important where only a short waveguide is required, or where a short sensing element is incorporated such as by splicing into a long waveguide, where the remainder of the waveguide has excellent light transmission properties.

Another example of a waveguide that can exhibit blackout as its temperature is increased is the waveguide having a silica cladding and a liquid core described in the above-mentioned Kibler Pat. No. 3,819,250. With a liquid core of carbon tetrachloride, blackout can occur at a temperature of about 25° C., provided the exterior surface of the silica tube is coated with a light absorptive material which prevents light transmission within the silica.

Another waveguide that exhibits blackout as its temperature is increased is one having a core of polymethylphenyl siloxane containing 12% phenyl by weight, and a cladding of a Kynar copolymer such as Kynar 7200 available from Pennwalt corporation, which is a copolymer of vinylidine fluoride and tetrafluoro ethylene.

It is important to be able to control the temperature at which blackout occurs. For example, for heat tracing of a pipeline containing an aqueous fluid, it is desirable that blackout occur at a temperature slightly greater than freezing so that a heating element can be activated before the water freezes.

Prior art waveguides exhibit blackout at temperatures of little practical significance. The present invention is directed to use of novel waveguides that exhibit blackout at temperatures of practical use. The novel waveguides exhibit blackout at selected blackout temperatures greater than about −20° C. and less than 200° C., and more preferably at temperatures greater than 0° C. and less than 100° C., i.e. temperatures of commercial interest. Preferably the core of the novel waveguide is solid over the temperature range of desired waveguide use.

One method to control the blackout temperature of a waveguide is to vary the refractive index of the cladding, the core, or both. For example, the waveguide comprising a silica core and GE 655 cladding was soaked in bromonapthalene which has a refractive index of 1.61. This raised the refractive index of the cladding, which had the effect of raising the blackout temperature. As shown in FIG. 2, the blackout temperature of this waveguide was raised to about 5° C. Other additives and dopants can be added to a cladding to either raise or lower its refractive index, depending upon the blackout temperature desired. Preferably the dopant used is non-volatile so that it remains permanently in the cladding or core. Satisfactory dopants for siloxane claddings include monomeric high boiling materials which are compatible with the siloxane cladding. Examples of dopants which can be used to raise the refractive index of siloxane cladding are 2, 2-dimethyltetraphenylcyclotrisiloxane; 1,1,1,5,5,5-hexamethyldiphenyltrisiloxane; hexaphenylcyclotrisilo xane; tetraphenylsilane; and diallyldiphenylsilane. The cladding can be irradiated to about 5 Mrads with an electron beam subsequent to imbibing in the dopant to permanently graft the dopant to the polymeric cladding. Other dopants can be introduced prior to the curing process.

Other materials which may be used as dopants are low molecular weight chlorinated phenylsiloxanes and nitrile containing siloxanes.

Monomeric high boiling materials such as neopentylglycolpolyadipate and paraffin oils which are not siloxanes can be used as dopants in small quantities, but they suffer from the fact that they are inadequately compatible with siloxane cladding and are expelled from the cladding with time.

Another approach that can be used to provide a waveguide with a higher blackout temperature than the blackout tempratures obtained with conventional silica/polydimethyl siloxane claddings is the development of waveguides comprised of materials heretofore not used as cladding materials. Novel cladding materials developed include claddings comprising a polyalkylphenyl siloxane, where the alkyl portion of the siloxane contains no more than 10 carbon atoms, and preferably is a methyl group. The phenyl content is preferably at least 15% by weight; as the phenyl content of a polymethylphenyl siloxane increases, the refractive index of the siloxane increases. Table 1 presents the refractive index of polymethylphenyl siloxanes as a function of their phenyl content. The percent by weight phenyl is based upon the total weight of the siloxane. Also presented in Table 1 is the blackout temperature of a waveguide comprising a silica core and a polymethylphenyl siloxane cladding having the specified phenyl content. All phenyl contents referred to herein are determined by ultraviolet spectroscopy.

TABLE 1

| % by Weight Ph | Refractive Index | Blackout Temp (°C.) |
|---|---|---|
| 16.25 | 1.446 | 0° C. |
| 17.0 | 1.448 | 5° C. |
| 18.25 | 1.451 | 10° C. |

TABLE 1-continued

| % by Weight Ph | Refractive Index | Blackout Temp (°C.) |
|---|---|---|
| 19.0 | 1.453 | 15° C. |

Cladding materials of different phenyl content can be prepared by blending methylphenyl siloxanes with different phenyl contents. However, in practice, it is found that blends which differ widely in phenyl content tend to be milky to opaque. Therefore, when blending methylphenyl siloxanes, preferably the siloxanes differ in refractive index by no more than about 0.02 and the viscosities of both siloxanes are in the range of from about 500 to about 10,000 cps as measured at 25° C.

It is also possible to cross-link methylphenyl siloxanes of different phenyl content. For example, by blending a methylphenyl siloxane having a viscosity of 2,000 cps and a phenyl content of 21% and having terminal vinyl content of 1 mole % with a second methylphenyl siloxane having a viscosity of 2,000 cps and a phenyl content of 16%, a cladding is produced which in combination with a silica core, provides any blackout temperature required in the range of 0° to 15° C.

A polyalkylphenyl siloxane of the desired phenyl content can be prepared according to conventional polymerization techniques, where the starting materials include dialkyl chlorosilane, diphenyl chlorosilane, and alkylphenyl chlorosilane. In preparing the polyalkylphenyl siloxane, the alkyl groups can be the same or different.

Another novel waveguide has a cladding made of a material that crystallizes as its temperature is lowered. FIG. 4 pesents the attenuation vs. temperature curve for a waveguide having a silica core of 200 microns, a first cladding of KE 103 having a thickness of 30 to 35 microns, and an outer cladding layer of Sylgard 184 having a thickness of 60 microns KE 103 is a low molecular weight polydimethyl siloxane available from Shin-Etsu of Japan that crystallizes as its temperature is lowered. The outer layer of Sylgard is required because the KE 103 has poor mechanical properties. As shown by FIG. 4, the waveguide exhibits a large and sudden increase in attenuation at about −56° C. as it temperature is decreased, and also exhibits a large and sudden decrease in attenuation at about −40° C. as its temperature is increased, showing a hysteresis effect. This large and sudden change in attenuation occurs because KE 103 is a linear, low molecular weight material and is able to crystallize. It has a differential scanning calorimeter melting point of −45° C. when warmed from −120° C. at 5° C. per minute. Thus sudden and large changes in attenuation result from the KE 103 and are caused by the material changing from a crystalline to an amorphous material at its melting point, and by the material changing from an amorphous material to a crystalline material at its freezing point.

At its crystallization temperature, a large increase in the refractive index of KE 103 occurs so that its refractive index is no longer less than the refractive index of the core. Thus blackout occurs. Also contributing to blackout is light scattering resulting from the crystallization.

To insure that the crystallization occurs at a specified temperature, it is believed that a nucleating agent such as fumed silica can be used to prevent the freezing point from varying as a result of super cooling of the polymer liquid.

As is evident from FIG. 4, an advantage of using a polymer that crystallizes as a cladding is that the blackout occurs over a very small temperature range. Thus, the waveguide can be used in applications where close control of the temprature of a material is essential.

To be useful in waveguides, a material that exhibits this crystallization phenomenon preferably is sufficiently optically clear to be used as a cladding, and has a refractive index lower than that of silica.

In addition to KE 103, copolymers of dimethylsiloxane and ehtylene oxide meet these requirements. The refractive index and crystalline melting point of the copolymer can be altered as required by varying the molar ration of the siloxane to the ethylene oxide and also by the chain length of the ethylene oxide block. A methd for making these copolymers is described in U.S. Pat. No. Re. 25,727 which is incorporated herein by this reference. Preferably the copolymer prepared has a refractive index less than that of silica (about 1.46 at 23° C.) so that it can be used as a cladding for silica cores. Particularly suitable polyethylene oxide dimethylsiloxane copolymers for water freeze protection are those whose preparation is described in Examples 1 and 2 of the 25,727 patent. These copolymers have a freezing point of 1° C. and refractive indices of 1.4595 and 1.4555, respectively. These copolymers can be protected from absorbing moisture by a water resistant exterior cladding.

Crosslinked polydialkyl siloxanes such as polydiethyl siloxane also exhibit this crystalline melting point phenomenon. Polyalkyl siloxanes for use as a cladding comprise the repeating unit:

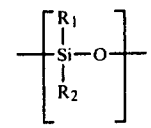

where each $R_1$ is independently selected from the group consisting of methyl, ethyl, and propyl groups; and where $R_2$ is independently an alkyl group, and preferably a linear alkyl group, of at least 10 carbon atoms, and preferably no more than about 20 carbon atoms.

These materials crystallize due to the presence of the long alkyl side groups. For example polymethylhexadecylsiloxane has a melting point of 42° C., a refractive index of 1.4524 (44° C.), and a freezing point of 27° C. Preferred materials are cross-linked polymethylalkyl siloxanes, i.e. $R_1$ is a methyl group.

The polymethylalkyl siloxanes can be prepared by reacting the alkene corresponding to the alkyl portion of the siloxane with polymethylhydrogen siloxane in the presence of chloroplatinic acid catalyst. From about 80 to about 95% of the hydrogens are reacted, and at least a portion of the remaining free hydrogens are cross-linked with cross-linking agents such as tetravinyl silane in the presence of chloroplatinic acid catalyst. Other polydialkyl siloxanes can be correspondingly prepared using polyethylhydrogen siloxane or polypropylhydrogen siloxane.

The amount of substitution affects the crystalline melting point. For example, polymethyltetradecyl siloxane, prior to cross-linking, has a crystalline melting point of 7° C. when 80% of the hydrogen is substituted with tetradecene, 12° C. with 90% substitution, and 14° C. with 100% substitution.

Waveguides consisting of a cladding of cross-linked polymethylpentadecyl siloxane on a glass core were prepared. When the glass core used was a silica cord, blackout occurred at about 5° C. When the glass core used was made from sodiumborosilicate, blackout occured at about −1° C.

Preferably a wavguide used in the present invention has a core with a diameter of from about 100 to about 300 microns, and most preferably about 200 microns. With cores of less than 100 microns, it is difficult to couple and connect the waveguide. Furthermore, with a larger core than 100 microns, it is possible to transmit larger amounts of light for longer distances. However, at diameters much greater than 300 microns, the advantages obtained are insufficient to overcome the increased material costs and breakage caused by bending.

Unless indicated otherwise, all refractive indices mentioned herein refer to the refractive index of a material measured at a temperature of 25° C. with sodium light 589 nm. However, the waveguides of the present invention are not limited to use with just visible light. They can be used with ultraviolet and infrared light. Thus the term "light" as used herin refers to visible light, ultraviolet light, and infrared light.

The cladding can be applied to the core in situ, where the cladding is cross-linked directly on the core. In applying a cladding to an optical fiber, preferably the fiber is coated before moisture or other contaminants reach the fibre. Also, it is important to avoid scratching or otherwise abrading the fiber because this can drastically reduce the tensile strength of the fiber. With these problems in mind, it is prefered to apply a cladding with a low modulus applicator such as that described by A. C. Hart, Jr., and R. B. Albarino in "An Improved Fabrication Technique For Applying Coatings To Optical Fiber Wave Guides", Optical Fiber Transmission II Proceedings, Februrary 1977. Preferably the cladding material is applied to the fiber core as a liquid.

In some applications it is desireable that the waveguide exhibits substantial change in its light transmission property at two temperatures. For example, when providing freeze protection, it is desirable that the waveguide used exhibits substantial attenuation of transmitted light at a temperature of about 5° C., and then exhibit even more attenuation at about 1° C. The 5° C. breakpoint can be used as a signal for turning on a heater, and the 1° C. breakpoint can be used as an emergency alarm. A waveguide suitable for such an application is shown in FIG. 5 and its attenuation vs. temperature curve is shown in FIG. 6.

Figure 5:
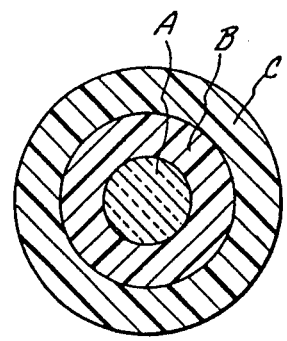
FIG. 5 is a cross-sectional view of a three-layer waveguide.

The waveguide of FIG. 5 comprises a core A, a first cladding B disposed on and around the exterior surface of the core, and a second cladding C disposed on and around the exterior surface of the first cladding. The refractive index of the first cladding B is less than the refractive index of the core A at temperatures greater than the first selected temperature $T_1$, and is greater than or equal to the refractive index of the core A at temperatures less than $T_1$. The refractive index of the second cladding C is less than the refractive index of the first cladding B at temperatures greater than the second selected temperature $T_2$ and is greater than or equal to the refractive index of the first cladding B at temperatures less than $T_2$. $T_1$ is greater than $T_2$.

Figure 6:
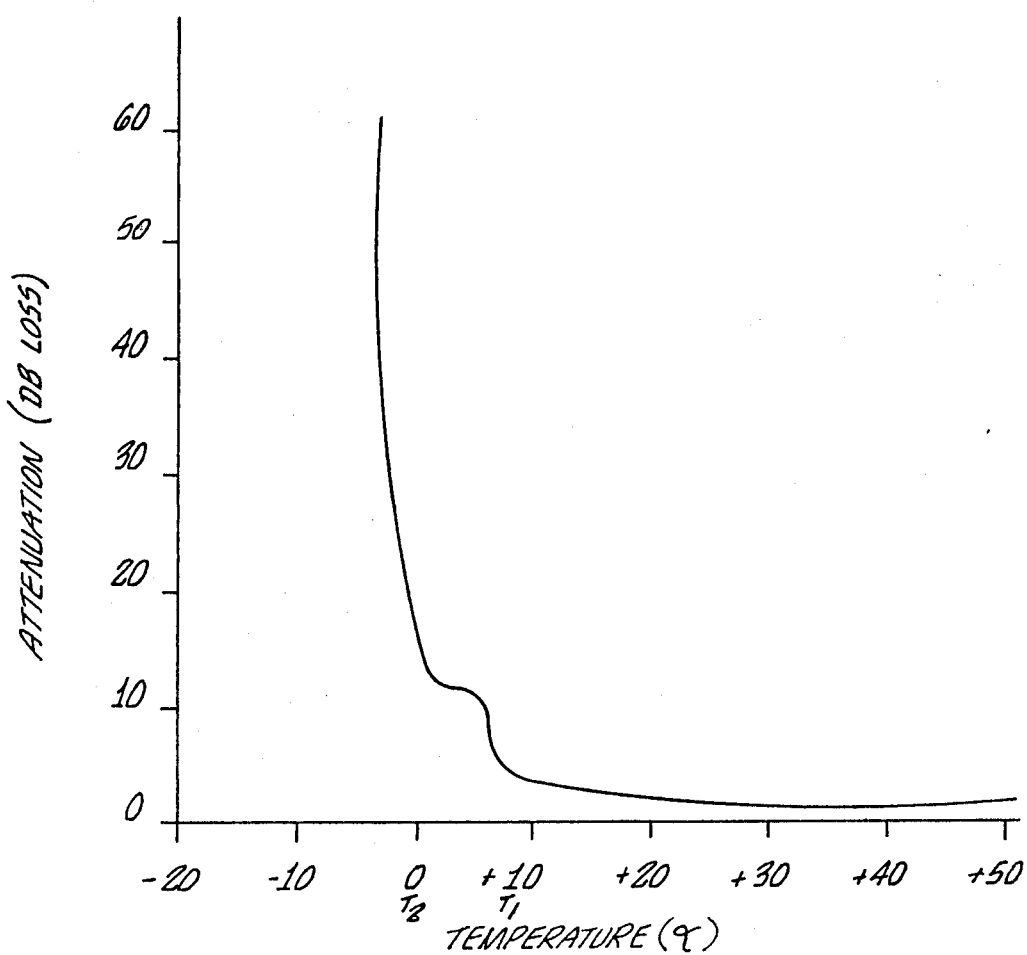
FIG. 6 is a graph of attenuation vs. temperature for a waveguide as shown in FIG. 5 where the core is glass and the outer two layers are cladding materials.

A waveguide of this construction has the attenuation vs. temperature curve as shown in FIG. 6. What occurs is that as the temperature of the waveguide is reduced to $T_1$, which corresponds to about 10° C. in FIG. 6, the refractive index of the first cladding becomes equal to the refractive index of the core. Thus, a portion of the transmitted light is absorbed by the cladding and the attenuation is increased. As the temperature of the waveguide is further decreased, the refractive index of the second cladding becomes equal to the refractive index of the core at $T_2$, which corresponds to about 0° C. in FIG. 6. At this point, blackout occurs.

To be readily detectable, preferably the level of attenuation that occurs at temperatures less than $T_1$ is at least 3 db greater than the level of attenuation at temperatures greater than $T_1$. Also, preferably the level of attenuation that occurs at temperatures less than $T_2$ is at least about 3 db greater than the level of attenuation at temperatures between $T_1$ and $T_2$. The amount of attenuation that occurs at temperatures less than $T_1$ can be controlled by varying the thickness of the first cladding. The smaller the thickness, the less attenuation that occurs. Preferably the first cladding layer is thinner than the second cladding layer, and generally is on the order of about 5 microns thick vs. about 20 microns thick for the second cladding layer.

An example of a waveguide that exhibits this two-step change in attenuation is one consisting of a silica core, a first cladding layer of cross-linked polymethylphenyl siloxane, and a second cladding of polydimethyl siloxane. For such a cladding $T_1$ is 14° C., and $T_2$ is −52° C.

Figure 7:
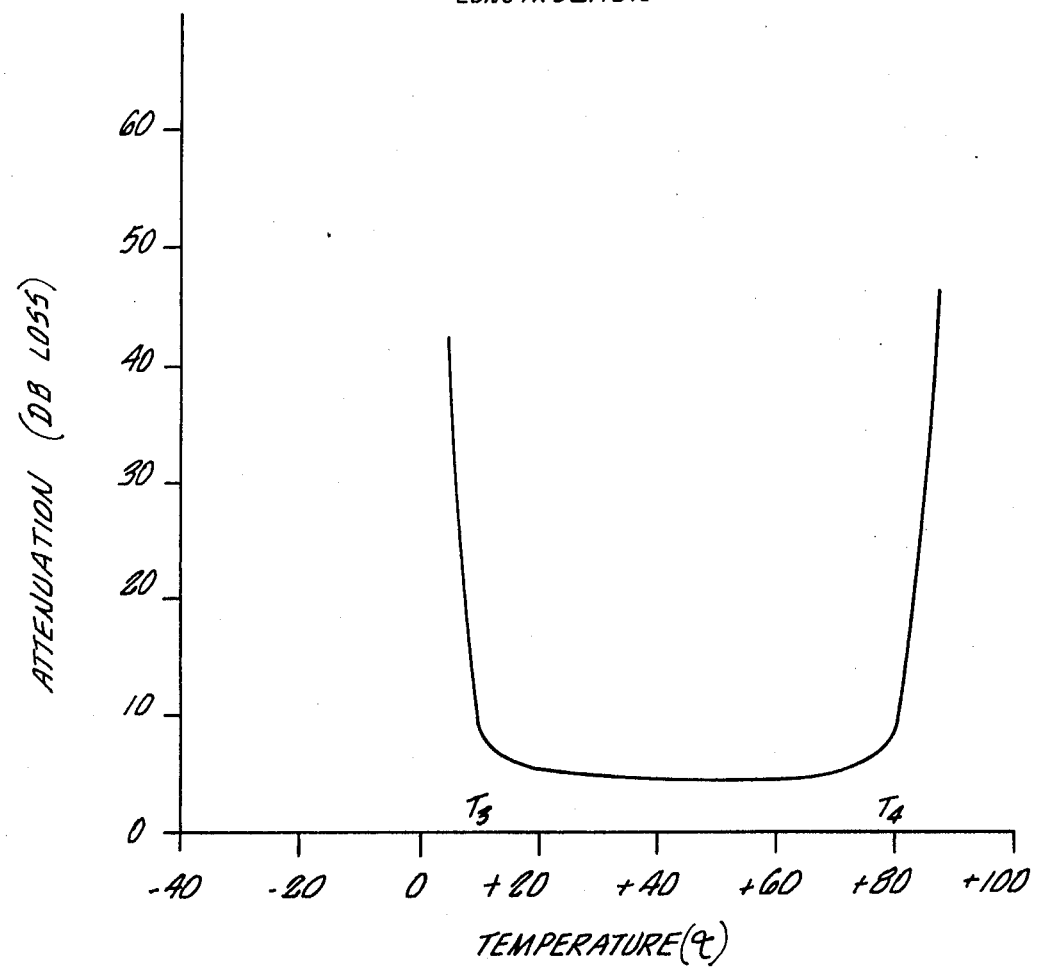
FIG. 7 is a graph of attenuation vs. temperature for a three layer waveguide where the inner and outer layers are cladding material and the middle layer is a light transmissive material.

In some applications it is desirable that a single waveguide exhibit blackout at both ends of a selected temperature range of $T_3$ to $T_4$. The attenuation vs. temperature curve of such a waveguide is shown in FIG. 7, where light is transmitted without substantial attenuation between about 10° C. to about 80° C., but at about 10° C. and 80° C., blackout occurs. A waveguide with this performance characteristic can have the construction shown in FIG. 5, where it comprises a core A of high loss material, a light transmissive layer B disposed on and around the exterior surface of the core, and an exterior cladding C disposed on and around the exterior surface of the light transmissive layer B. The core A is a poorer transmitter of light at temperatures lower than or equal to $T_3$ than is the light transmissive layer. The refractive index of the light transmissive layer B is greater than the refractive indices of both the core A and the exterior cladding C only at temperatures within the selected temperature range of $T_3$ to $T_4$, $T_3$ being less than $T_4$. At temperatures less than $T_3$, the refractive index of the core A is greater than or equal to the refractive index of the light transmissive layer B, so that light is no longer contained by the core A in the light transmissive layer B because the core A is made of a high loss material, light passing into the core is absorbed and blackout occuring. At temperatures greater than $T_4$, the refractive index of the exterior cladding C is greater than or equal to the refractive index of the light transmissive layer B. Because C is a less light transmissive material than B, there is an increase in attenuation at temperatures greater than $T_4$.

The change in refractive index vs. temperature for the components of a waveguide constructed in accordance with this version of the invention is shown in FIG. 8. These refractive index curves correspond to the attenuation curve shown in FIG. 7. As shown in FIG 8, the refractive index of the core A is less than the refractive index of the light transmissive layer B at temperatures greater than about 10° C.(T$_3$). At temperatures greater than about 80° C.(T$_4$), the refractive index of the exterior cladding C is greater than the refractive index of the light transmissive layer B.

A waveguide having the attenuation vs. temperature curve shown in FIG. 7 can comprise a core A made of polymethyltetradecyl siloxane, a light transmissive layer B of polymethylphenyl siloxane of 35% by weight phenyl content, and an outer cladding C of silica coated with polymethylphenyl siloxane of more than 50% by weight phenyl content, and containing 5% by weight of carbon black.

Another waveguide having the attenuation vs. temperature curve of FIG. 7 can be prepared where the refractive index of the core A is greater than or equal to the refractive index of the light transmissive layer B at temperatures greater than or equal to T$_4$, and the refractive index of the exterior cladding C is greater than or equal to the refractive index of the light transmissive layer B at temperatures less than or equal to T$_3$. The core is a poorer light transmitter at temperatures greater than or equal to T$_4$ than is the light transmissive layer B.

As described above, in some applications, it is desirable that once a waveguide undergoes a substantial change in its light transmission properties, that change be permanent and irreversible. An example of such a waveguide is one having a polyvinylidene fluoride core (available under the trade name Kynar from Pennwalt) or polymethylmethacrylate core, and a cladding of polydimethyl siloxane. The core is loaded with about 1% by weight of an antioxidant such as 2, 6 di-teriary butyl para-cresol. When the loaded core is irradiated with gamma rays to 5 Mrads, it becomes colored due to color centers forming from the antioxidant. Thus, due to the coloring, the amount of light transmission is substantially reduced. However, when the temperature of the core is raised up to about its melting point, the color centers are permanently eliminated. Thus, once a waveguide with the core having color centers is heated up to about the melting point of the core, the waveguide is permanently changed to one that can transmit light.

As noted above, only a portion of a waveguide needs to exhibit blackout as a result of a temperature change. Thus a waveguide can have portions which exhibit blackout at a selected temperature or within a selected temperature range, where the portions are separated by a portion that does not exhibit blackout at the selected temperature or within the selected temperature range. This is particularly useful when the sensing element exhibits relatively poor transmission properties even when it is operating in its mode of transmitting light.

In addition, a single waveguide can include a plurality (two or more) sensing elements which exhibit blackout at different temperatures. For example, one sensing element can be activated at about 0° C. as cooled and another sensing element can be activated at about 100° C. as heated. With such a waveguide, light can be transmitted only from about 0 to about 100° C. Such a waveguide can be used as part of a system for keeping water liquid.

A method of making such a waveguide with different temperature responsive sections is to remove a portion of the cladding from the conventional waveguide and replace the removed portion of the cladding with cladding that results in the waveguide having a temperature responsive sensing element. For example, a two centimeter length of the cladding can be removed from a waveguide comprising silica core and a GE670 cladding (a branched polydimethylsiloxane). The cladding can be removed with wire strippers, followed by removal of any residue with tetramethylguanidine, followed by a rinse with toluene and then isopropanol. The waveguide is maintained in a fixed position so that bare core can be surrounded with uncured cladding which can be cured in position. The cladding can be a methylphenylsiloxane whose refractive index controls the blackout temperature, or a methylalkylsiloxane in which the blackout temperature depends on the crystalline melting point of the cladding.

Another method for preparing a waveguide having a short sensing element therein is to dope the cladding of a waveguide at selected locations with a dopant that alters the refractive index of the cladding.

Rather than curing a replacement cladding in situ to replace a cladding that has been stripped from the waveguide, the new cladding can be placed inside a heat shrinkable sleeve. The heat shrinkable sleeve can be placed in position over an area of the waveguide where the cladding has been removed and then heated, thereby shrinking the sleeve. The coating on the inside of the sleeve can then provide a cladding having refractive index properties that provide the waveguide with a useful sensing element.

Another method for producing a single waveguide having one or more sensing elements along its length, where the sensing elements can exhibit a substantial change in light transmission properties at different temperatures, is to pass the core through two applicators which are in tandem. By using a starve-feed system to each of the applicators, different claddings having different refractive index characteristics can be applied to different lengths of the core.

The following examples present waveguides useful in the present invention.

EXAMPLE 1

The Example shows how a waveguide having a blackout temperature of about 0° C. for use in freeze protection can be prepared.

Figure 9:
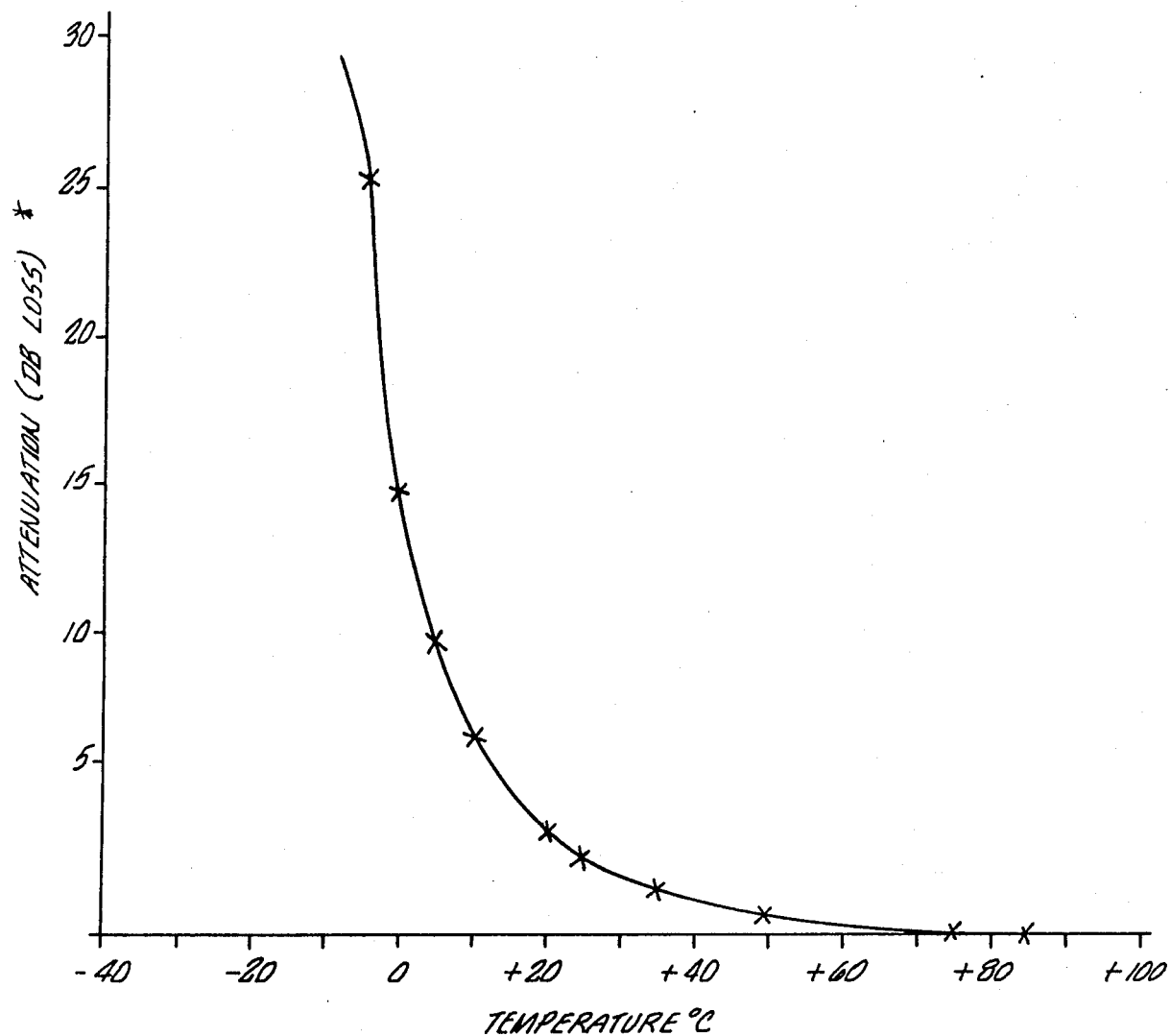
FIGS. 9 and 10 are graphs of attenuation vs. temperature for the waveguides of Examples 1 and 2, respectively, presented hereinbelow.

A nine meter length of waveguide comprising a 200 micron fused silica core and a cladding of about 30 microns thick of polydimethylsiloxane available under the trade name GE670 was prepared. A two centimeter length of the cladding was mechanically stripped. Any residue present was removed with tetramethylguanidine and rinsed with toluene and isopropanol. The waveguide was held in a fixed position and the uncoated fiber was surrounded with a methylphenylsiloxane solution. The solution consisted of 21.84% of a methylphenylsiloxane containing 15.5% phenyl by weight, 58.16% of a methylphenylsiloxane containing 20.5% phenyl by weight, and 20% of a methylphenylsiloxane containing 7% phenyl by weight. The refractive index of the solution before curing was 1.4466 and after curing in situ in the presence of a chloroplatinaic acid catalyst, the refractive index was 1.4498. The thickness of the new cladding was about ¼ inch. The attenuation vs. temperature curve for the waveguide is presented in FIG. 9.

EXAMPLE 2

Figure 10:
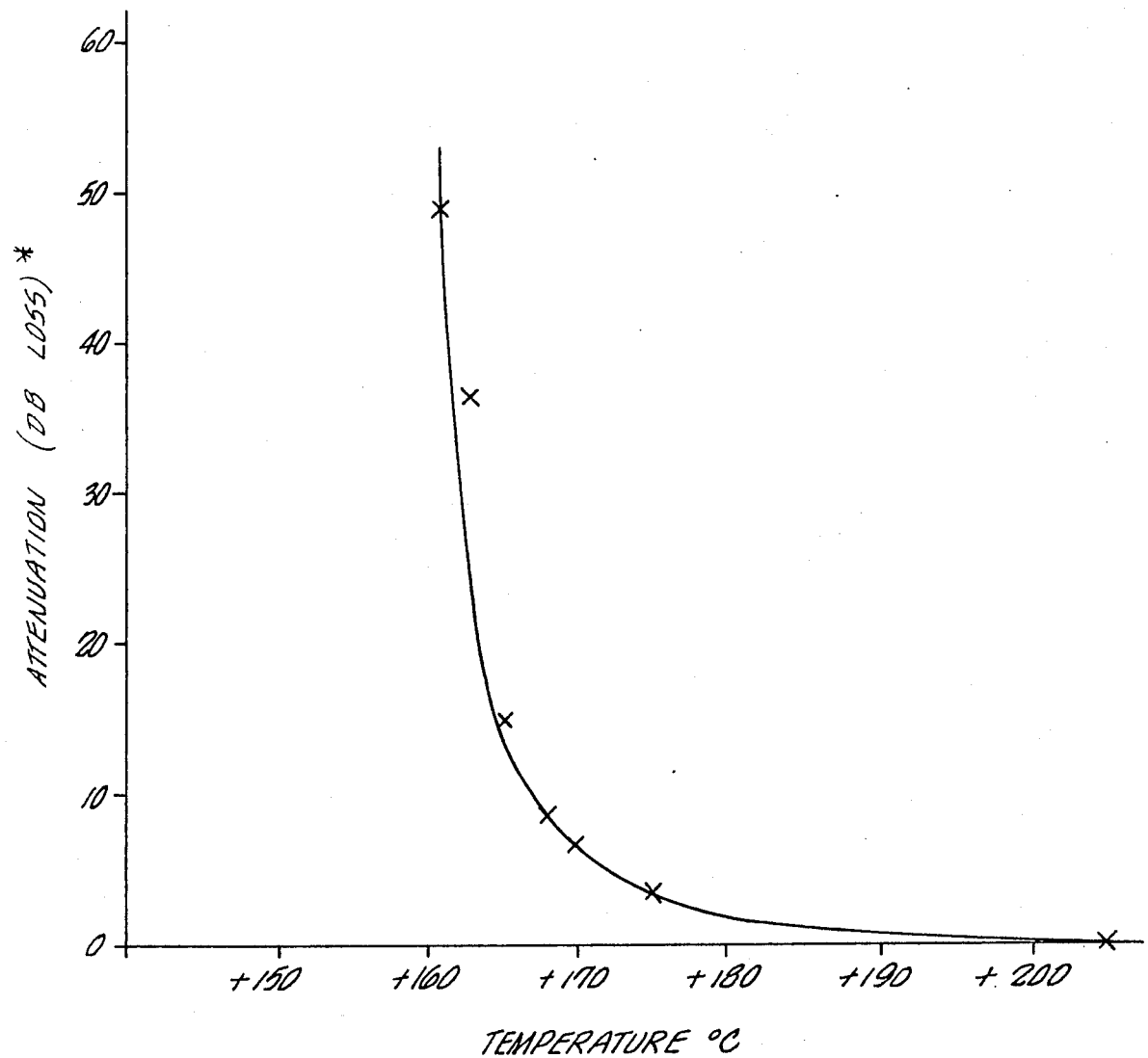

Using the same waveguide originally used for Example 1, a two centimeter length of the polydimethylsiloxane cladding was replaced with a siloxane composition containing 43% by weight phenyl and having a refractive index of 1.513 before curing. The waveguide did not transmit light at room temperature. However, as shown in FIG. 10, at temperatures above 160° C., the waveguide did transmit light.

EXAMPLE 3

This example demonstrates preparation of a waveguide that cannot transmit light at ambient temperature, but when raised to an elevated temperature, irreversibly changes so that it can transmit light, even after its temperature is reduced to ambient temperature.

A waveguide was prepared having a core of polymethylmethacrylate having a diameter of 0.013 inch. The cladding was polydimethylsiloxane having a thickness of about 50 microns. A second waveguide was prepared, differing from the first waveguide in that it contained 1% by weight of Irganox 1010, an antioxidant available from Ciba Geigy. When light from a helium neon laser was directed through each of the waveguides, the first waveguide transmitted light along the length of 22 inches and the second waveguide transmitted light satisfactorily along a length of 28 inches as detected visually be the experimenter.

Both fibers were irradiated with a high energy electron beam to 10 Mrads. The first fiber still allowed light to transmit an amount of 60% of the previous length. However, the second fiber would not allow any light to be transmitted. The second fiber was heated to 80° C. for two hours and was then able to transmit light in an amount of 50% of its original transmission properties, even after its temperature was reduced to ambient temperature.

C. Applications

A wide variety of applications are available for using the waveguides described above. For example, according to the present invention, a material can be maintained within a selected temperature range. This is accomplished by placing at least part of a waveguide in thermal communication with the material so that the temperature of the part of the waveguide is responsive to the temperature of the material. The waveguide is selected so that it exhibits blackout at a temperature at about the top and/or at about the bottom of the selected temperature range. Light is directed at one end of the waveguide and the intensity of light transmitted by the part of the waveguide in thermal communication with the material is monitored. At the onset of a substantial change in the intensity of light transmitted by said part of the waveguide, the temperature of the material is adjusted so that it is within the selected range.

Such a temperature control system can be used for many applications. For example, it can be used for over-temperature protection or for under-temperature protection of motors. In over-temperature protection, when the temperature of the motor is higher than a selected temperature, the motor is automatically shut off. In such an application, the temperature range that is desired is all temperatures less than the temperature at which the motor is to be shut off. Under-temperature protection can be used to prevent a motor from being started up if the temperature is too cool for the oil to properly lubricate the motor. In such an application, the temperature range desired is all temperatures greater than a selected temperature.

Such a system can also be used for over temperature protection in aircraft, motor vehicles, process equipment, and the like. It can be used in automobiles for anti-freeze protection with an alarm system in case any part of a car radiator system is below a pre-determined temperature. It can be used in dams and water systems to determine when freezing is taking place. It can be used as part of a waterbed heater control system by using a waveguide having a blackout temperature of about 90° F. It can be used during charging of batteries to prevent over heating of the battery or to prevent charging of the battery when it is too cold for safe charging. For example, a temperature control system can be provided for a nickel cadmium battery because such batteries can explode if charged at temperatures less than about 0° C.

For many applications, it is desirable to use a waveguide with a blackout temperature of at least −20° C. because there are only limited applications at temperatures lower than −20° C. For example, a waveguide that has a blackout temperature of −20° C. can be used for detecting leaks of liquefied natural gas. Also, freeze protection of aqueous solutions requires a waveguide with a blackout temperature at a temperature higher than −20° C.

This concept can better be understood with reference to FIG. 11. In FIG. 11 it is assumed that it is desired to keep a material within a temperature range $T_1$ to $T_2$. To keep the material at a temperature no higher than $T_2$, waveguide A or waveguide B can be used, where both of these waveguides have a blackout temperature at about $T_2$. Waveguide A transmits light without substantial attenuation at temperatures greater than $T_2$, and waveguide B transmits light without substantial attenuation at temperatures less than $T_2$. When waveguide A is used, if the monitor used detects a substantial increase in the intensity of light transmitted, this indicates that the material is heating to a temperature greater than $T_2$, and it is necessary to cool the material. When waveguide B is used, if the monitor detects a substantial decrease in the light transmitted this indicates that the material is heating to a temperature greater than $T_2$, and it is necessary to cool the material.

To maintain the material at a temperature higher than $T_1$, waveguide C or waveguide D can be used, both of which have a blackout temperature at about $T_1$. Waveguide C transmits light without substantial attenuation at temperatures less than $T_1$ and waveguide D transmits light at temperatures greater than $T_1$. When waveguide C is used if the monitor determines that there is a substantial increase in the light transmitted, this indicates that the material is cooling to a temperature less than $T_1$, and it is necessary to heat the material. When waveguide D is used, if the monitor detects a substantial decrease in the light being transmitted, this indicates that the temperature of the material is cooling to a temperature less than $T_1$, and it is necessary to heat the material.

By the terms "at about the top of the selected temperature range" and "at about the bottom of the selected temperature range", there are meant temperatures which provide sufficient time to adjust the temperature of the material to maintain it within the desired temperature range. For example, when keeping water from freezing, a waveguide with a blackout temperature of about 5° C. can be used.

This technique could be used for preventing materials from changing phase, such as preventing water from freezing or boiling, or preventing a solid from melting or sublimating, or preventing a gas from condensing. For example, to prevent water from freezing, a waveguide can be placed in thermal communication with the water, where the waveguide exhibits blackout at a temperature slightly above the freezing temperature of water. By "slightly above" there is meant a temperature which provides sufficient time to heat the water to prevent it from freezing. For example, a waveguide that transmits light at temperatures above about 5° C., and has a blackout temperature at about 5° C. is suitable. Light is directed at one end of the waveguide and the intensity of light transmitted by the waveguide is monitored. At the onset of a substantial change in the intensity of the light transmitted by the waveguide, the water is heated to prevent it from freezing.

According to the present invention, waveguide temperature sensing systems can be used for preventing the viscosity of a liquid from changing beyond a selected value. For example, when pumping petroleum products in a pipeline, or pumping petroleum from a well, it is important to maintain the petroleum at a sufficiently high temperature that it can easily be pumped. For this purpose, conduits such as pipelines in cold environments are provided with a heating element, such as steam tracing, electrical resistant heaters, or strip heaters comprising a conductive polymer. According to the present invention, a waveguide that exhibits blackout at a temperature corresponding to the temperature at which the viscosity of the liquid increases above a selected value is placed in thermal communication with the liquid. This can be effected by placing the waveguide longitudinally or spirally along the exterior of the pipeline or longitudinally or spirally within the pipeline. The advantage of using fiber optic systems is that even if a waveguide breaks, there is no danger of an explosion and no fire hazard associated with the waveguide. This is unlike an electrical powered temperature sensing system. Light is directed at one end of the waveguide and the intensity of light transmitted by the waveguide is monitored. At the onset of a substantial change in the intensity of light transmitted, the liquid is heated to lower its viscosity.

The present invention can also be used for detecting leaks of fluids out of a container. In general, the waveguides can be used for detecting leakage of a fluid from a container where the fluid is at a temperature other than ambient temperature, i.e., lower than ambient temperature or higher than ambient temperature. For example, a waveguide having the attenuation vs. temperature curve of the Ge 655 clad waveguide shown in FIG. 2 can be placed adjacent a container of liquid nitrogen or liquified natural gas. Light can be directed at tone end of the waveguide and the other end of the waveguide can be monitored. The presence of blackout indicates that leakage of the liquid nitrogen or LNG is occurring.

In some applications, it is possible to detect leakage of a fluid that is at ambient temperature. In such an application, the waveguide is maintained at a temperature other than ambient temperature by a cooling or heating jacket or the like. Upon leakage of the fluid, the temperature of the jacket and waveguide changes towards ambient temperature. The waveguide can be selected so that as its temperature approaches ambient temperature, its light transmission properties undergo a substantial change.

Use of waveguides is not limited to detecting leakage of a fluid from a container; they can also be used as part of monitoring systems in pipelines and the like to determine where the fluid is flowing. For example, for a tank having a plurality of valves, a waveguide can be provided on the downstream side of each valve, so that when the valve is opened, a signal is generated indicating that fluid is passing through the valve.

Another application for waveguides of the present invention is for detecting the level of a fluid (i.e., liquid or gas) in a container, the fluid having a temperature different from ambient temperature. This is effected by selecting a waveguide, at least a portion of which exhibits blackout as the temperature of said portion is changed from ambient temperature to the temperature of the fluid, or a waveguide that begins to transmit light as the temperature of said portion is changed from ambient temperature to the temperature of the fluid. That portion of the waveguide is placed into the container, light is directed at one end of the waveguide, and the intensity of light transmitted by the portion is monitored. The onset of a substantial change in the intensity of light transmitted by the portion indicates that the portion is in thermal communication with the fluid. Fluids can be measured in tanks, cargo holds, deep wells, and the like.

FIG. 12 shows an article 10 that makes use of the present invention. The article comprises an outer tubular sleeve 12, which can be made of a heat-recoverable material, a heat activatable insert 16, and a waveguide 17 that has a blackout temperature at about the activation temperature of the heat-activatable insert 16. A common problem in using such articles is that the craftsmen in the field can be uncertain as to whether the entire heat-activatable material has been activated. This can be a serious problem when the heat-activatable material is a meltable material such as solder or an adhesive such as a heat-activatable adhesive or mastic which requires heat to perform its bonding and sealing functions. In applying the article 10, the craftsman should heat the entire article so that the entire heat-activatable insert is activated. However, because the insert is within the sleeve 12, a craftsman is unable to determine whether or not this occurs. However, with the article of FIG. 12, this problem is remedied.

The waveguide 17 is one that undergoes a change in its light transmission characteristics once it reaches a temperature at which the heat-recoverable material has recovered and the insert has been activated. Preferably the change is permanent and irreversible because with long articles 10, after one end of it has been heated to a desired temperature, that end can cool down to below the required temperature while the remainder of the article 10 is being heated. If a waveguide that did not undergo a permanent change were used, an operator might needlessly reheat the first end.

The heat-activatable material can be fusable material such as solder or polymeric material, an adhesive that requires heat for activation, and the like. The sleeve 12 can be made of a heat-recoverable or a heat-expandable material. It can be a polymeric material made from metal or other materials. Furthermore, it need not be heat recoverable at all, but only serve to hold a heat-activatable material in location until the activatable material has been activated, and then the sleeve is ready for removal. The sleeve need not be continuous in cross-section, but can have a slot along its length. Likewise, the sleeve need not be circular in cross-section, but can have different shapes. Exemplary of articles for which the present invention can be used are those described in U.S. Pat. Nos. 3,243,211; 3,297,819; 3,305,625; 3,312,772; 3,316,343; 3,324,230; 3,382,121; 3,415,287; 3,525,799; 3,539,411; 3,610,291; 3,770,556; 3,847,721; 3,852,517; 3,946,143; 3,957,382; 3,975,039; 3,988,399;

3,990,661; 3,995,964; 4,016,356; 4,045,604; 4,092,193; 4,126,759 and 4,179,320, all of which are incorporated herein by this reference.

Although the present invention has been described in considerable detail with reference to certain versions thereof, other versions are possible. For example, waveguides can be used on the leading edge of airplanes to detect icing. They can be used in cable trays in nuclear power plants to check for overheating. Therefore the spirit and scope of the appended claims should not necessarily be limited to the description of the preferred versions contained herein.

What is claimed is:

1. A method for maintaining a material within a temperature range of from $T_1$ to $T_2$, $T_1$ being less than $T_2$, and $T_2$ being less than 200° C., the method comprising the steps of:
   (a) placing at least part of a waveguide in thermal communication with the material so that the temperature of said part of the waveguide is responsive to the temperature of the material, the waveguide comprising a core and a cladding disposed on and around the exterior surface of the core, said part of the waveguide exhibiting blackout at a blackout temperature TB, TB being about equal to $T_2$;
   (b) directing light at an end of the waveguide;
   (c) monitoring the intensity of light transmitted by said part of the waveguide, the onset of a substantial change in the intensity of light transmitted by said part indicating that the temperture of the material is about TB ; and
   (d) at the onset of the substantial change in the intensity of the light transmitted by said part of the waveguide, cooling the material so that it is within the temperature range.

2. The method of claim 1 wherein at TB, said part of the waveguide exhibits attenuation at least about 3 dB greater than the attenuation said part exhibits at temperatures less than TB, and the step of cooling comprises cooling the material when said part of the waveguide exhibits an increase in attenuation of at least about 3 dB.

3. The method of claim 1 wherein at TB, said part of the waveguide exhibits attenuation at least about 3 dB greater than the attenuation said part exhibits at temperatures greater than TB, and the step of cooling comprises cooling the material when said part of the waveguide exhibits a decrease in attenuation of at least about 3 dB.

4. A method for maintaining a material within a selected temperature range of from $T_1$ to $T_2$, $T_1$ being less than $T_2$ and $T_2$ being less than 200° C., the method comprising the steps of:
   (a) placing at least part of a waveguide in thermal communication with the material so that the temperature of said part of the waveguide is responsive to the temperature of the material, the waveguide comprising a core and a cladding disposed on and around the exterior surface of the core, said part of the waveguide exhibiting blackout at a blackout temperature TB, TB being about equal to $T_1$;
   (b) dircting light at an end of the waveguide;
   (c) monitoring the intensity of light transmitted by said part of the waveguide, the onset of a substantial change in the intensity of light transmitted by said part indicating that the temperature of the material is about TB; and
   (d) at the onset of the substantial change in the intensity of the light transmitted by said part of the waveguide heating the material so that it is within the temperature range.

5. The method of claim 4 wherein at TB, said part of the waveguide exhibits attenuation at least about 3 dB greater than the attenuation said part exhibits at temperatures greater than TB and the step of heating comprises heating the material when said part of the waveguide exhibits and increase in attenuation of at least about 3 dB.

6. The method of claim 4, wherein at TB, said part of the waveguide exhibits attenuation at least about 3 dB greater than the said part exhibits at temperatures less than TB, and the step of heating comprises heating the material when said part of the waveguide exhibits a decrease in attenuation of at least about 3 dB.

7. The method of claim 1 or 4 wherein said part of the waveguide transmits light when the temperature of the material is above TB.

8. The method of claim 1 or 4 wherein said part of the waveguide transmits light when the temperature of the material is below TB.

9. The method of claim 1 or 4 wherein $T_1$ is 0° C.

10. The method of claim 1 or 4 wherein $T_2$ is 0° C.

11. The method of claim 1 or 4 wherein $T_1$ is −20° C.

12. The method of claim 1 or 4 wherein $T_1$ is greter than −20° C.

13. A method for preventing a material from solidifying comprising the steps of:
   (a) placing at least part of a waveguide in thermal communication with the material so that the temperature of the waveguide is responsive to the temperature of the material, the waveguide comprising a core and cladding disposed on and around the exterior surface of the core, said part of the waveguide exhibiting blackout at a blackout temperature TB slightly above the temperture TS at which the material solidifies, TS being less than 200° C;
   (b) directing light at an end of the waveguide; (c) monitoring the intensity of light transmitted by the waveguide, the onset of a substantial change in the intensity of the light transmitted by said part indicating that the material is at a temperature only slightly above TS; and
   (d) when not heating the material and said substantial change in the intensity of light transmitted by said part is detected by monitoring, heating the material to prevent it from solidifying.

14. The method of claim 13 in which the step of heating comprises heating the material for a sufficient time that there is a substantial change in the intensity of light transmitted by said part of the waveguide.

15. The method of claim 13 in which said substantial change in the intensity of light transmitted occurs when the material is at a temperature $T_1$, which is greater than $T_2$, where $T_2$ equals TS plus about 5° C.

16. The method of claim 13 where TB is at least about 5° C. higher than TS.

17. The method of claim 13 in which TS is greater than −20° C.

18. A method for preventing the viscosity of a liquid in a conduit from increasing above the viscosity V1 of the liquid at a temperature $T_1$, $T_1$ being less than 200° C., the viscosity of the liquid increasing as its temperature decreases, the method comprising the steps of:
   (a) placing at least part of a waveguide in thermal communication with the liquid so the temperature of said part of the waveguide is responsive to the temperature of the liquid, the waveguide comprising a core and cladding disposed on and around the exterior surface of the core, said part of the waveguide exhibiting blackout at about $T_1$ and transmitting light when the viscosity of the liquid is below $V_1$;
(b) directing light at an end of the waveguide;
(c) monitoring the intensity of light transmitted by the waveguide; and
(d) when a substantial decrease in the intensity of light transmitted by the waveguide is detected, heating the liquid to lower its viscosity.

19. A method for preventing the viscosity of a liquid in a conduit from increasing above the viscosity $V_1$ of the liquid at a temperature $T_1$, $T_1$ being less than 200° C., the viscosity of the liquid increasing as its temperature decreases, the method comprising the steps of:
(a) placing at least part of a waveguide in thermal communication with the liquid so the temperature of said part of the waveguide is responsive to the temperature of the liquid, the waveguide comprising a core and cladding disposed on and around the exterior surface of the core, said part of the waveguide exhibiting blackout at about $T_1$ but transmitting light when the viscosity of the liquid is above $V_1$;
(b) directing light at an end of the waveguide;
(c) monitoring the intensity of light transmitted by the waveguide; and
(d) when a substantial increase in the intensity of light transmitted by the waveguide is detected, heating the liquid to lower its viscosity.

20. The method of claim 18 or 19 wherein said part of the waveguide is on the exterior of the conduit.

21. The method of claim 18 or 19 wherein said part of the waveguide is within the conduit and in direct contact with the liquid.

22. The method of claim 18 or 19 wherein $T_1$ is greater than $-20°$ C.

23. A method for preventing a material from changing from a first phase to a second phase comprising the steps of:
(a) placing at least part of a waveguide in thermal communication with the material so that the temperature of the waveguide is responsive to the temperature of the material, the waveguide comprising a core and a cladding disposed on and around the exterior surface of the core, said part of the waveguide exhibiting blackout at a blackout temperature TB slightly different from the temperature, TC, at which the material changes from the first phase to the second phase, TB and TC being less than 200° C.;
(b) directing light at an end of the waveguide;
(c) monitoring the intensity of light transmitted by the waveguide, the onset of a substantial change in the intensity of the light transmitted by said part indicating that the material is at a temperature only slightly different from TC; and
(d) when the substantial change occurs, adjusting the temperature of the material so that the temperature of the material remains sufficiently different from TC that the material remains in the first phase.

24. The method of claim 23 in which the material is a solid in its first phase and a liquid in its second phase, and the step of adjusting comprises cooling the material.

25. The method of claim 23 in which the material is a liquid in its first phase and a solid in its second phase, and the step of adjusting comprises heating the material.

26. The method of claim 23 in which TC is greater than $-20°$ C.

27. A method for detecting passage of a fluid out of a container comprising the steps of:
(a) placing at least part of a waveguide in a position proximate to the container so that the temperature of the waveguide is at a first temperature $T_1$ when no fluid passes out of the container and is at a second temperature $T_2$ when fluid passes out of the container, the waveguide comprising a core and cladding disposed on and around the exterior surface of the core, said part of the waveguide exhibiting blackout at a blackout temperature between $T_1$ and $T_2$ so that the waveguide exhibits a substantial change in the intensity of light transmitted when the temperature of said part changes from $T_1$ to $T_2$, both $T_1$ and $T_2$ being less than 200° C.;
(b) directing light at an end of the waveguide; and
(c) monitoring at the other end of the waveguide the intensity of light transmitted by the waveguide, the onset of a substantial change in the intensity of light transmitted by said part indicating that the fluid is passing out of the container.

28. The method of claim 27 wherein $T_1$ is ambient temperature and the fluid is at $T_2$ which is different from ambient temperature.

29. The method of claim 27 wherein the step of placing comprises placing said part of the waveguide so that it directly contacts the fluid when the fluid passes out of the container.

30. The method of claim 27 wherein the blackout temperature is greater than $-20°$ C.

31. A method for applying an article to a substrate, the article containing a heat-activatable material, the method comprising the steps of:
(a) placing the article on the substrate;
(b) placing at least part of a waveguide in thermal communication with the article so that the temperature of the waveguide is responsive to the temperature of the heat-activatable material, the waveguide comprising a core and a cladding disposed on and around the exterior surface of the core, the waveguide exhibiting blackout at a blackout temperature no less than the temperature at which the heat-activatable material is activated;
(c) directing light at an end of the waveguide;
(d) monitoring the intensity of light transmitted by the waveguide, the onset of a substantial change in the intensity of the light transmitted by the waveguide indicating that the material has been activated; and
(e) heating the article at least until the intensity of light transmitted by the waveguide has undergone the substantial change.

32. The method of claim 31 wherein the blackout temperature is less than 200° C.

33. A method for applying an article to a substrate, the article containing a heat-activatable material, the method comprising the steps of:
(a) placing the article on the substrate;
(b) placing at least part of a waveguide in thermal communication with the article so that the temperature of the waveguide is responsive to the temperature of the heat-activatable material, the waveguide comprising a core and a cladding disposed on and around the exterior surface of the core, the waveguide exhibiting blackout at a blackout temperature slightly greater than the temperature at which the heat-activatable material is activated, the blackout temperature being less than 200° C. and greater than 31 20° C.;

(c) directing light at an end of the waveguide;

(d) monitoring the intensity of light transmitted by the waveguide, the onset of a substantial change in the intensity of the light transmitted by the waveguide indicating that the material has been activated; and (e) heating the article at least until the intensity of light transmitted by the waveguide has undergone the substantial change.

34. The method of claim 31 or 33 wherein the article is a heat-recoverable article.

35. The method of claim 31 or 33 wherein the waveguide transmits light when it is at a temperature above the blackout temperature, and the step of heating comprises heating the article at least until the waveguide transmits light.

36. The method of claim 35 wherein when the waveguide is heated to a temperature above the blackout temperature, the waveguide permanently transmits light.

37. The method of claim 35 in which the heat-activatable material is a meltable material, wherein the waveguide is placed in thermal communication with the meltable material and transmits light only at temperatures higher than the temperature at which the meltable material melts, and the step of heating comprises heating the meltable material.

38. The method of claim 31 or 33 in which the article is tubular, the heat-activatable material is within the article and is not visible when the article is placed on the substrate, and at least part of the waveguide is within the article.

39. The method of claim 31 or 33 in which the heat-activatable material is solder.

40. The method of claim 31 or 33 in which the heat-activatable material is an adhesive.

41. A method for determining the level of a fluid in a container, the fluid having a temperature different from ambient temperature and less than 200° C., the method comprising the steps of:

(a) selecting a waveguide, at least a portion of which exhibits blackout at a blackout temperature between ambient temperature and the temperature of the fluid;

(b) placing said portion of the waveguide in the container;

(c) directing light at an end of the waveguide; and (d) monitoring the intensity of light transmitted by said portion of the waveguide, the onset of a substantial change in the intensity of light transmitted by said portion indicating that said portion is in thermal communication with the fluid.

42. The method of claim 41 in which the fluid has a temperature less than ambient temperature.

43. The method of claim 41 or 42 in which the fluid has a temperature greater than −20° C.

44. Apparatus for maintaining a material within a temperature range of from $T_1$ to $T_2$, $T_1$ being less than $T_2$, and $T_2$ being less than 200° C., the apparatus comprising:

(a) a waveguide, at least part of the waveguide being in thermal communication with the material so that the temperature of said part of the waveguide is responsive to the temperature of the material, the waveguide comprising a core and cladding disposed on and around the exterior surface of the core, said part of the waveguide exhibiting blackout at a blackout temperature TB, TB being about equal to $T_2$;

(b) means for directing light at an end of the waveguide;

(c) means for monitoring the intensity of light transmitted by said part of the waveguide; and (d) means for cooling the material when the means for monitoring detects a substantial change in the intensity of the light transmitted by said part of the waveguide.

45. The apparatus of claim 44 wherein at TB, said part of the waveguide exhibits attenuation at least about 3 dB greater than the attenuation said part exhibits at temperatures less than TB, and the means for cooling cools the material when said part of the waveguide exhibits an increase in attenuation of at least about 3 dB.

46. The apparatus of claim 44 wherein at TB, said part of the waveguide exhibits attenuation at least about 3 dB greater than the attenuation said part exhibits at temperatures greater than TB, and the means for cooling cools the material when said part of the waveguide exhibits a decrease in attenuation of at least about 3 dB.

47. Apparatus for maintaining a material within a temperature range of from $T_1$ to $T_2$, $T_1$ being less than $T_2$, and $T_2$ being less than 200° C., the apparatus comprising:

(a) a waveguide, at least part of the waveguide being in thermal communication with the material so that the temperature of said part of the waveguide is responsive to the temperature of the material, the waveguide comprising a core and cladding disposed on and around the exterior surface of the core, said part of the waveguide exhibiting blackout at a blackout temperature TB, TB being about equal to $T_1$ (b) means for directing light at an end of the waveguide;

(c) means for monitoring the intensity of light transmitted by said part of the waveguide; and (d) means for heating the material when the means for monitoring detects a substantial change in the intensity of the light transmitted by said part of the waveguide.

48. The apparatus of claim 47 wherein at TB, said part of the waveguide exhibits attenuation at least about 3 dB greater than the attenuation said part exhibits at temperatures greater than TB and the means for heating heats the material when said part of the waveguide exhibits an increase in attenuation of at least about 3 dB.

49. The apparatus of claim 47 wherein at TB, said part of the waveguide exhibits attenuation at least about 3 dB greater than the said part exhibits at temperatures less than TB, and the means for heating heats the material when said part of the waveguide exhibits a decrease in attenuation of at least about 3 dB.

50. The apparatus of claim 44 or 47 wherein said part of the waveguide transmits light when the temperature of the material is about TB.

51. The apparatus of claim 44 or 47 wherein said part of the waveguide transmits light when the temperature of the material is below TB.

52. The apparatus of claim 44 or 47 wherein $T_1$ is 0° C.

53. The apparatus of claim 44 or 47 wherein $T_2$ is 0° C.

54. The apparatus of claim 53 wherein $T_1$ is −20° C.

55. The apparatus of claim 44 or 47 wherein $T_1$ is greater than −20° C.

56. Apparatus for preventing the viscosity of a liquid in a conduit from increasing above the viscosity V1 of the liquid at a temperature $T_1$, $T_1$ being less than 200° C., the viscosity of the liquid increasing as its temperature decreases, the apparatus comprising:
 (a) a waveguide, at least part of which is in thermal communication with the liquid so that the temperature of said part of the waveguide is responsive to the temperature of the liquid, the waveguide comprising a core and a cladding disposed on and around the exterior surface of the core, said part of the waveguide exhibiting blackout at about $T_1$ but transmitting light when the viscosity of the liquid is below V1;
 (b) means for directing light at an end of the waveguide;
 (c) means for monitoring the intensity of light transmitted by the waveguide; and
 (d) means for heating the liquid to lower its viscosity when the means for monitoring detects a substantial decrease in the intensity of the light transmitted by said part of the waveguide.

57. Apparatus for preventing the viscosity of a liquid in a conduit from increasing above the viscosity V1 of the liquid at a temperature $T_1$, $T_1$ being less than 200° C., the viscosity of the liuid increasing as its temperature decreases, the apparatus comprising:
 (a) a waveguide, at least part of which is in thermal communication with the liquid so that the temperature of said part of the waveguide is responsive to the temperature of the liquid, the waveguide comprising a core and a cladding disposed on and around the exterior surface of the core, said part of the waveguide exhibiting blackout at about $T_1$ and transmitting light when the viscosity of the liquid is above V1;
 (b) means for directing light at an end of the waveguide;
 (c) means for monitoring the intensity of light transmitted by the waveguide; and
 (d) means for heating the liquid to lower its viscosity when the means for monitoring detects a substantial increase in the intensity of the light transmitted by said part of the waveguide.

58. The apparatus of claim 56 or 57 wherein said part of the waveguide is on the exterior of the conduit.

59. The apparatus of claim 56 or 57 wherein said part of the waveguide is within the conduit and in direct contact with the liquid.

60. the apparatus of claim 56 or 57 wherein $T_1$ is greater than −20° C.

61. Apparatus for preventing a material from changing from a first phase to a second phase comprising:
 (a) a waveguide, at least part of which is in thermal communication with the material so that the temperature of said part of the waveguide is responsive to the temperature of the material, the waveguide comprising a core and a cladding disposed on and around the exterior surface of the core, said part of the waveguide exhibiting blackout at a blackout temperature TB slightly different from the temperature TC at which the material changes from the first phase so the second phase, TB and TC being less than 200° C;
 (b) means for directing light at one end of the waveguide;
 (c) means for monitoring the intensity of light transmitted by the waveguide; and
 (d) means for adjusting the temperature of the material so that the temperature of the material remains sufficiently different from TC that the material remains in the first phase when the means for monitoring detects a substantial change in the intensity of light transmitted by the waveguide.

62. The apparatus of claim 61 in which the material is a solid in its first phase and a liquid in its second phase, and the means for adjusting comprises means for cooling the material.

63. The apparatus of claim 61 in which the material is a liquid in its first phase and a solid in its second phase and the means for adjusting comprises means for heating the material.

64. The apparatus of claim 61 in which TC is greater than −20° C.

65. Apparatus for detecting passage of a fluid out of a container comprising:
 (a) a waveguide, at least part of which is in a position proximate to the container so that the temperature of said part is at a first temperature $T_1$ when no fluid passes out of the container and is at a second temperature $T_2$ when fluid passes out of the container, the waveguide comprising a core and a cladding disposed on and around the exterior surface of the core, said part of the waveguide exhibiting backout at a blackout temperature between $T_1$ and $T_2$ so that the waveguide, exhibits blackout when the temperature of said part changes from $T_1$ to $T_2$, both $T_1$ and $T_2$ being less than 200° C.;
 (b) means for directing light at one end of the waveguide; and
 (c) means for monitoring the intensity of light transmitted by said part of the waveguide, the oneset of a substantial change in the intensity of light transmitted by said part indicating the fluid is passing out of the container.

66. The apparatus of claim 65 in which $T_1$ is ambient temperature and the fluid is at $T_2$ which is different from ambient temperature.

67. The apparatus of claim 65 in which said part of the waveguide directly contacts the fluid when the fluid passes out of the container.

68. The apparatus of claim 65 wherein the blackout temperature is greater than −20° C.

69. An article containing a heat-activatable material and a waveguide in thermal communication with the heat-activatable material so that the temperature of the waveguide is responsive to the temperature of the heat-activatable material, the waveguide comprising a core and a cladding disposed on and around the exterior surface of the core, wherein the waveguide exhibits blackout at a blackout temperature no less than the temperature at which the heat-activatable material is activated.

70. The article of the claim 69 in which the blackout temperature is less than 200° C.

71. The article of claim 70 wherein the waveguide transmits light when it is at a temperature above the blackout temperature.

72. The article of claim 71 wherein the waveguide permanently transmits light when it is at a temperature above the blackout temperature.

73. The article of claim 70 in which the heat-activatable material is meltable.

74. The article of claim 73 in which the heat-activatable material is solder.

75. The article of claim 73 in which the heat-activatable material is an adhesive.

76. An article containing a heat-activatable material and a waveguide in thermal communication with the heat-activatable material so that the temperature of the waveguide is responsive to the temperature of the heat-activatable material, the wave-guide comprising a core and a cladding disposed on and around the exterior surface of the core, wherein the waveguide exhibits blackout at a selected blackout temperature TB no less than the temperature at which the heat-activatable material is activated, TB being less than 200° C. and greater than −20° C.

77. The article of claim 69 wherein the article is heat-recoverable.

78. The article of claim 77 wherein the waveguide exhibits blackout at a temperature no less than the temperature at which the heat-recoverable article heat recovers.

79. The article of claim 69 or 76 wherein the waveguide transmits light when it is at a temperature above the blackout temperature.

80. The article of claim 79 wherein the waveguide permanently transmits light when it is at a temperature above the blackout temperature.

81. The article of claim 69 or 76 in which the heat-activatable material is meltable.

82. The article of claim 81 in which the heat-activatable material is solder.

83. The article of claim 69 or 76 in which the heat-activatable material is an adhesive.

84. The article of claim 69 or 76 in which the article is tubular, the heat-activatable material is within the article and is not visible when the article is placed on a substrate, and at least part of the waveguide is within the article.

85. Apparatus for applying an article comprising a heat-activatable material to a substrate, comprising:
(a) a waveguide, at least part of which is in thermal communication with the article, so that the temperature of said part is responsive to the temperature of the heat-activatable material, the waveguide comprising a core and a cladding disposed on and around the exterior surface of the core, said part of the waveguide exhibiting blackout at a blackout temperature no less than the temperature at which the heat-activatable material is activated;
(b) means for directing light at an end of the waveguide;
(c) means for monitoring the intensity of light transmitted by said part of the waveguide; and
(d) means for heating the article at least until the intensity of light transmitted by said part has undergone a substantial change.

86. The apparatus of claim 85 wherein the article is heat-recoverable.

87. The apparatus of claim 70 or 86 in which the article is tubular, the heat-activatable material is within the article and is not visible when the article is placed on a substrate, and at least part of the waveguide is within the article.

88. The apparatus of claim 86 wherein the waveguide exhibits blackout at a temperature no less than the temperature at which the heat-recoverable article heat recovers.

89. The apparatus of claim 85 in which the blackout temperature is less than 200° C.

90. The apparatus of claim 85 or 89 in which blackout temperature is greater than −20° C.

91. Apparatus for determining the level of a fluid in a container, the fluid having a temperature different from ambient temperature and less than 200° C., comprising:
(a) a waveguide, at least a portion of which exhibits blackout at a blackout temperature between ambient temerature and the temperature of the fluid, said portion of the waveguide being in the container;
(b) means for directing light at one end of the waveguide; and
(c) means for monitoring the intensity of light transmitted by the waveguide.

92. The invention of claim 41 or 91 wherein the waveguide comprises a core and a cladding disposed on and around the exterior surface of the core, and wherein the cladding has a crystalline melting point greater than −20° C., and the refractive index of the cladding is less than the retractive index of the core at temperatures greater than the crystalline melting point of the cladding and is greater than or equal to the refractive index of the core at temperatures less than or equal to the crystalline melting point.

93. The invention of claim 41 or 91 wherein the waveguide comprises a core and a cladding disposed on and around the exterior surface of the core, and wherein the cladding comprises a cross-linked polydialkyl siloxane comprising the repeating unit:

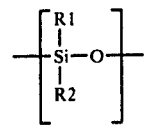

where each R1 in a polymer chain is independently selected from the group consisting of methyl, ethyl, and propyl groups; and where each R2 in a polymer chain is independently an alkyl group of at least 10 carbon atoms and the R1's in a polymer chain can be the same or different and the R2's in a polymer chain can be the same or different.

94. A method for charging a battery, the battery being unsuitable for charging at temperatures less than $T_1$, the method comprising the steps of:
(a) placing a waveguide in thermal communication with the battery, the waveguide comprising a core and cladding disposed on and around the core, the waveguide exhibiting blackout at a blackout temperature TB slightly above $T_1$, the waveguide transmitting substantially no light at temperatures less than TB;
(b) directing light at an end of the waveguide;
(c) monitoring the intensity of light transmitted by the waveguide, substantially no light transmitted by the waveguide indicating that the battery should not be charged; and
(d) charging the battery only when light is transmitted by the waveguide.

95. A method for charging a battery, the battery being unsuitable for charging at temperatures less than $T_1$, the method comprising the steps of:
  (a) placing a waveguide in thermal communication with the battery, the waveguide comprising a core and cladding disposed on and around the core, the waveguide exhibiting blackout at a blackout temperature TB slightly above $T_1$, the waveguide transmitting substantially no light at temperatures greater than TB;
  (b) directing light at an end of the waveguide;
  (c) monitoring the intensity of light transmitted by the waveguide, light being transmitted by the waveguide indicating that the battery should not be charged; and
  (d) charging the battery only when substantially no light is transmitted by the waveguide.

96. Apparatus for charging a battery, the battery being unsuitable for charging at temperatures less than $T_1$, the apparatus comprising:
  (a) a waveguide in thermal communication with the battery, the waveguide comprising a core and cladding disposed on and around the core, the waveguide exhibiting blackout at a blackout temperature TB slightly above $T_1$, the waveguide transmitting substantially no light at temperatures less than TB;
  (b) means for directing light at an end of the waveguide;
  (c) means for monitoring the intensity of light transmitted by the waveguide; and
  (d) means for charging the battery only when light is transmitted by the waveguide.

97. Apparatus for charging a battery, the battery being unsuitable for charging at temperatures less than $T_1$, the apparatus comprising:
  (a) a waveguide in thermal communication with the battery, the waveguide comprising a core and cladding disposed on and around the core, the waveguide exhibiting blackout at a blackout temperature, TB, slightly above $T_1$, the waveguide transmitting substantially no light at temperatures greater than TB;
  (b) means for directing light at an end of the waveguide;
  (c) means for monitoring the intensity of light transmitted by the waveguide; and
  (d) means for charging the battery only when substantially no light is transmitted by the waveguide.

98. A method for preventing water from freezing comprising the steps of:
  (a) placing at least part of a waveguide in thermal communication with the water so that the temperature of the waveguide is responsive to the temperature of the water, the waveguide comprising a core and a cladding disposed on and around the exterior surface of the core, said part of the waveguide exhibiting blackout at a selected blackout temperature slightly above 0° C.;
  (b) directing light at an end of the waveguide;
  (c) monitoring the intensity of light transmitted by the waveguide, the onset of a substantial change in the intensity of the light transmitted by said part indicating that the material is at a temperature only slightly above 0° C.; and
  (d) when the substantial change occurs heating the water.

99. A method for preventing a material from melting comprising the steps of:
  (a) placing at least part of a waveguide in thermal communication with the material so that the temperature of the waveguide is responsive to the temperature of the material, the waveguide comprising a core and cladding disposed on and around the exterior surface of the core, said part of the waveguide exhibiting blackout at a selected blackout temperature TB slightly below the temperature TM at which the material melts, TM being less than 200° C.;
  (b) directing light at an end of the waveguide;
  (c) monitoring the intensity of light transmitted by the waveguide, the onset of a substantial change in the intensity of the light transmitted by said part indicating that the material is at a temperature only slightly below TM; and
  (d) when not cooling the material and said substantial change in the intensity of light transmitted by said part is detected by monitoring, cooling the material to prevent it from melting.

100. The method of claim 99 in which the step of cooling comprises cooling the material for a sufficient time that there is a substantial change in the intensity of light transmitted by said part of the waveguide.

101. The method of claim 99 in which said substantial change in the intensity of light transmitted occurs when the material is at a temperature $T_1$, which is less than $T_2$ where $T_2$ is the temperature at which the material melts minus about 5° C.

102. The method of claim 99 where TB is at least about 5° C. less than TM.

103. The method of claim 99 in which TM is greater than $-20°$ C.

104. A method for detecting passage of liquified natural gas out of a container comprising the steps of:
  (a) placing at least part of a waveguide in a position proximate to the container so that the temperature of the waveguide is at ambient temperature when no liquified natural gas passes out of the container and is at a second temperature $T_2$ when liquified natural gas passes out of the container, $T_2$ being less than ambient temperature, the waveguide comprising a core and cladding disposed on and around the exterior surface of the core, said part of the waveguide exhibiting blackout at a blackout temperature between ambient temperature and $T_2$ so that the waveguide exhibits a substantial change in the intensity of the light transmitted when the temperature of said part changes from ambient temperature to $T_2$;
  (b) directing light at an end of the waveguide; and
  (c) monitoring at the other end of the waveguide the intensity of light transmitted by the waveguide, the onset of a substantial change in the intensity of light transmitted by said part indicating that the liquified natural gas is passing out of the container.

105. The method of claim 104 wherein the blackout temperature is greater than $-20°$ C.

106. An apparatus for preventing a material from solidifying comprising:
  (a) a waveguide, at least part of which is in thermal communication with the material so that the temperature of the waveguide is responsive to the temperature of the material, the waveguide comprising a core and cladding disposed on and around the exterior surface of the core, said part of the waveguide exhibiting blackout at a blackout temperature TB slightly above the temperature TS at which the material solidifies, TS being less than 200° C.;

(b) means for directing light at an end of the waveguide;

(c) means for monitoring the intensity of light transmitted by the waveguide, the onset of a substantial change in the intensity of the light transmitted by said part indicating that the material is at a temperature only slightly above TS; and (d) means for heating the material to prevent it from solidifying when said substantial change in the intensity of light transmitted by said part is detected by the means for monitoring.

107. The apparatus of claim 106 in which TS is greater than $-20°$ C.

108. Apparatus for preventing water from freezing comprising:

(a) a waveguide, at least part of which is in thermal communication with the water, so that the temperature of the waveguide is responsive to the temperature of the water, the waveguide comprising a core and a cladding disposed on and around the exterior surface of the core, said part of the waveguide exhibiting blackout at a selected blackout temperature slightly above 0° C.;

(b) means for directing light at an end of the waveguide;

(c) means for monitoring the intensity of light transmitted by the waveguide, the onset of a substantial change in the intensity of the light transmitted by said part indicating that the material is at a temperature only slightly above 0° C.; and (d) means for heating the water when the substantial change occurs.

109. Apparatus for preventing a material from melting comprising:

(a) a waveguide, at least part of which is in thermal communication with the material so that the temperature of the waveguide is responsive to the temperature of the material, the waveguide comprising a core and cladding disposed on and around the exterior surface of the core, said part of the waveguide exhibiting blackout at a blackout temperature TB slightly below the temperature TM at which the material melts, TM being less than 200° C.;

(b) means for directing light at an end of the waveguide;

(c) means for monitoring the intensity of light transmitted by the waveguide, the onset of a substantial change in the intensity of the light transmitted by said part indicating that the material is at a temperature only slightly below TM; and (d) means for cooling the material when said substantial change in the intensity of light transmitted by said part is detected by said monitoring means.

110. The apparatus of claim 109 in which TM is greater than $-20°$ C.

111. The invention of claim 1, 4, 13, 18, 19, 23, 27, 31, 44, 47, 56, 57, 61, 65, 69, 85, 94, 95, 96, 98, 99, 104, 33, 76, 106, 108, or 109 wherein the cladding has a crystalline melting point greater than 20° C., and the refractive index of the cladding is less than the refractive index of the core at temperatures greater than the crystalline melting point of the cladding and is greater than or equal to the refractive index of the core at temperatures less than or equal to the crystalline melting point.

112. The invention of claim 1, 4, 13, 18, 19, 23, 27, 31, 44, 47, 56, 57, 61, 65, 69, 85, 94, 95, 96, 98, 99, 104, 33, 76, 106, 108, or 109 where the cladding comprises a cross-linked polydialkyl siloxane comprising the repeating unit:

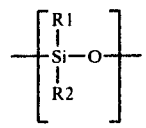

where each R1 in a polymer chain is independently selected from the group consisting of methyl, ethyl, and propyl groups; and wherein each R2 in a polymer chain is independently an alkyl group of at least 10 carbon atoms and the R1's in a polymer chain can be the same or different and the R2's in a polymer chain can be the same or different.

113. A method for charging a battery, the battery being unsuitable for charging at temperatures greater than $T_1$, the method comprising the steps of:

(a) placing a waveguide in thermal communication with the battery, the waveguide comprising a core and cladding disposed on and around the core, the waveguide exhibiting blackout at a blackout temperature TB slightly below $T_1$, the waveguide transmitting substantially no light at temperatures greater than TB;

(b) directing light at an end of the waveguide;

(c) monitoring the intensity of light transmitted vby the waveguide, light being transmitted by the waveguide indicating that the battery can be charged; and (d) charging the battery only when light is transmitted by the waveguide.

114. A method for charging a battery, the battery being unsuitable for charging at temperatures greater than $T_1$, the method comprising the steps of:

(a) placing a waveguide in thermal communication with the battery, the waveguide comprising a core and cladding disposed on and around the core, the waveguide exhibiting blackout at a blackout temperature TB slightly below $T_1$, the waveguide transmitting substantially no light at temperatures less than TB;

(b) directing light at an end of the waveguide;

(c) monitoring the intensity of light transmitted by the waveguide, light being transmitted by the waveguide indicating that the battery should not be charged; and (d) charging the battery only when substantially no light is transmitted by the waveguide.

115. The method of claiim 94, 95, 113 or 114 wherein TB is less than 200° C.

116. The method of claim 115 where TB is greater than $-20°$ C.

117. Apparatus for charging a battery, the battery being unsuitable for charging at temperatures greater than $T_1$, the apparatus comprising:

(a) a waveguide in thermal communication with the battery, the waveguide comprising a core and cladding disposed on and around the core, the waveguide exhibiting blackout at a blackout temperature TB slightly below $T_1$, the waveguide transmitting substantially no light at temperatures greater than TB;
(b) means for directing light at an end of the waveguide;
(c) means for monitoring the intensity of light transmitted by the waveguide; and
(d) means for charging the battery only when light is transmitted by the waveguide.

118. Apparatus for charging a battery, the battery being unsuitable for charging at temperatures greater than $T_1$, the apparatus comprising:
(a) a waveguide in thermal communication with the battery, the waveguide comprising a core and cladding disposed on and around the core, the waveguide exhibiting blackout at a blackout temperature TB slightly below $T_1$, the waveguide transmitting substantially no light at temperatures less than TB;
(b) means for directing light at an end of the waveguide;
(c) means for monitoring the intensity of light transmitted by the waveguide; and
(d) means for charging the battery only when substantially no light is transmitted by the waveguide.

119. The apparatus of claim 96, 97, 117, or 118 where TB is less than 200° C.

120. The apparatus of claim 119 where TB is greater than $-20°$ C.

* * * * *